Aug. 13, 1963 J. V. DAVIS 3,100,453

FRAMELESS TRACK AUTOMATIC CONVEYING APPARATUS

Filed Dec. 12, 1960 14 Sheets-Sheet 1

INVENTOR.
John V. Davis
BY
Harness, Dickey + Pierce
ATTORNEYS.

INVENTOR.
John V. Davis
BY
Harness, Dickey & Pierce
ATTORNEYS.

INVENTOR.
John V. Davis
BY
Harness, Dickey & Pierce
ATTORNEYS

Aug. 13, 1963 J. V. DAVIS 3,100,453

FRAMELESS TRACK AUTOMATIC CONVEYING APPARATUS

Filed Dec. 12, 1960 14 Sheets-Sheet 4

INVENTOR.
John V. Davis
BY
Harness, Dickey & Pierce
ATTORNEYS

INVENTOR.
John V. Davis
BY
Harness, Dickey & Pierce
ATTORNEYS.

INVENTOR.
John V. Davis

BY
Harness, Dickey & Pierce
ATTORNEYS.

INVENTOR.
John V. Davis
BY
Harness, Dickey & Pierce
ATTORNEYS.

INVENTOR.
John V. Davis
BY
Harness, Dickey & Pierce
ATTORNEYS.

INVENTOR.
John V. Davis
BY
Harness, Dickey & Pierce
ATTORNEYS

INVENTOR.
John V. Davis
BY
Harness, Dickey & Pierce
ATTORNEYS

FRAMELESS TRACK AUTOMATIC CONVEYING APPARATUS

Filed Dec. 12, 1960 14 Sheets-Sheet 11

INVENTOR.
John V. Davis
BY
Harness, Dickey & Pierce
ATTORNEYS.

INVENTOR.
John V. Davis
BY
Harness, Dickey & Pierce
ATTORNEYS.

FRAMELESS TRACK AUTOMATIC CONVEYING APPARATUS

INVENTOR.
John V. Davis
BY
Harness, Dickey & Pierce
ATTORNEYS

FRAMELESS TRACK AUTOMATIC CONVEYING APPARATUS

Filed Dec. 12, 1960

14 Sheets-Sheet 14

INVENTOR.

John V. Davis

BY

Harness, Dickey & Pierce

ATTORNEYS.

3,100,453
FRAMELESS TRACK AUTOMATIC CONVEYING APPARATUS

John V. Davis, Grosse Pointe, Mich., assignor to The Udylite Corporation, Detroit, Mich., a corporation of Delaware Filed Dec. 12, 1960, Ser. No. 75,377
28 Claims. (Cl. 104—128)

The present invention broadly pertains to conveying apparatus for transferring a plurality of workpieces through a series of treating stations and more particularly to an improved sectionalized conveying apparatus comprising a series of assemblable sections of a standard design which can be readily prefabricated and assembled in a selected arrangement in accordance with a specific plant layout to provide a specific operating sequence.

A variety of conveying apparatuses of the type adapted to automatically and sequentially convey a plurality of workpieces through a prescribed treating sequence are commercially available which are custom designed to comply, with a specific plant installation and operating sequence. Each such custom designed machine requires a substantial expenditure of design and development engineering effort to assure that the appropriate operating function and durability are attained. A number of conveying machines are available of a standard design which in only few instances can be employed without extensive modification in order to adapt them to a specific operating function. There has accordingly been a long felt heretofore unfilled need for a conveying machine having a standardized construction which enables simple modification thereof to adapt it to a specific treating sequence and plant layout.

It is a primary object of the present invention to provide a sectionalized conveying machine which satisfies the foregoing heretofore unfilled need and comprises a series of standardized assemblable and disassemblable sections which can be connected in a selected arrangement to provide an automatic integrated conveying machine having a prescribed operating function that is adapted for installation in a specific plant layout.

Another object of this invention is to provide a sectionalized conveying machine comprising a series of standard sections assemblable in any selected arrangment and providing flexibility and versatility heretofore unobtainable in automatic conveying apparatus.

Still another object of this invention is to provide a sectionalized conveying machine comprising a series of standardized sections assemblable in a selected arrangement to provide a specific operating sequence and which sectionalized construction eliminates the present time consuming and costly practice of preliminary assembling and testing the machine and thereafter disassembling the machine for shipment and re-assembling the components at the plant.

A further object of this invention is to provide a sectionalized conveying machine comprising a series of standardized sections assemblable in a selected arrangement to provide a preselected operating sequence and which sectionalized construction substantially reduces the design and development engineering effort to achieve a prescribed operating function.

A still further object of this invention is to provide a sectionalized conveying machine which in its basic form does not incorporate a large and heavy overlying superstructure enabling higher lifting movements for a given overhead clearance thereby permitting the use of deeper treating stations and longer work racks and concurrently simplifying the structure of the machine.

Yet another object of this invention is to provide a sectionalized conveying machine that can be simply provided with overhead engaging rail sections at selected stations to enable automatic selective skip, delay dip on early pick-up operation of selected work carriers at these stations further increasing the processing flexibility and versatility of the machine.

A still further object of this invention is to provide a sectionalized conveying machine that is of simple design, of durable operation, and of economical manufacture.

The foregoing and other objects of this invention are achieved by a conveying machine characterized by a sectionalized construction comprising a series of assemblable standardized conveyor sections including fixed conveyor sections of varying standard lengths having a fixed supporting rail or track thereon and lift conveyor sections incorporating a vertically movable rail or track section for lifting successive work carriers as they are sequentially advanced along the supporting rail through a series of treating receptacles in order that they can be transferred above the partitions separating adjoining treating receptacles. Intermittent advancement of the work carriers along the fixed supporting rail sections is achieved by a reciprocable primary pusher mechanism disposed below the supporting rail and adapted to engage the work carriers thereon. The primary pusher mechanism is operatively connected to an auxiliary pusher mechanism in each of the lift sections to advance the work carriers along the movable rail sections when in the raised position. Movement of the movable rail sections to and from a lowered position and a raised position is achieved by a reciprocable lift member operatively connected to the movable rail sections of each lift section. The conveying machine can also be provided with overhead engaging rail sections along selected portions of the machine for engaging and maintaining selected work carriers in the raised position thereby achieving selective skip, delayed-dip, or early pick-up operation at selected treating stations.

Other objects and advantages of the present invention will become apparent from the following detailed description taken in conjunction with the accompanying drawings, wherein:

FIG. 8 is a transverse vertical sectional view taken through the fixed rail portion of the lift section as shown in FIG. 4 and taken along the line 8—8 thereof;

Figure 1:
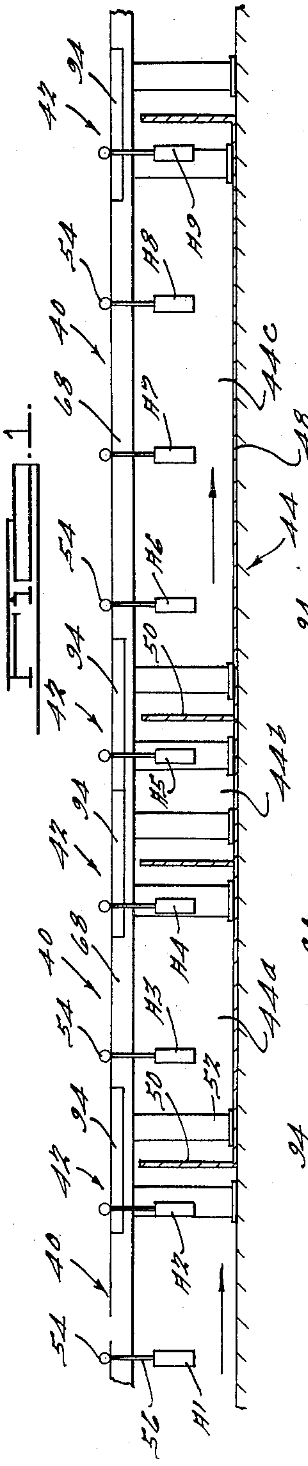
FIGURES 1 to 3 are schematic side elevation views illustrating a typical arrangement of fixed conveyor sections and lift sections positioned in and above a series of treating receptacles and further illustrating a typical operating sequence of the machine.

Referring now in detail to the drawings and as may be best seen in FIGURES 1 to 4, a conveying machine constructed in accordance with the preferred embodiments of this invention is comprised of a series of conveyor sections including fixed conveyor sections 40 and lift conveyor sections 42 extending over an aligned series of treating receptacles 44. The treating receptacles 44 are comprised of a pair of side partitions 46 disposed in spaced substantially parallel relationship and extending upwardly from a base 48 which is supported on a suitable foundation or underlying framework. A series of transverse partitions 50 extend between the side partitions 46 defining an aligned series of single station and multiple station treating receptacles. The elongated frame of the fixed conveyor sections 40 and lift sections 42 are supported over the treating receptacles 44 by a series of upright stanchions 52 which extend down into the treating receptacles and are supported by the base 48 thereof. As will be noted in FIGURES 1 to 3 the fixed conveyor sections 40 extend above the treating receptacles and are connected at their ends to the lift sections 42. The lift sections 42 are disposed above the transverse partitions 50 in order that a plurality of work carriers 54 having work racks 56 suspended therefrom can be lifted and transferred over the partitions 50 to the next adjoining treating receptacles.

Each of the lift sections 42 are of a standardized construction and accordingly, only one need be described in detail. The lift section 42 as may be best seen in FIGS. 4 to 11, includes an upper frame comprising a U-shaped channel member 58 including a pair of upstanding side flanges 60 which are fixedly secured at their lower edges to a horizontal base flange 62. The upper ends of the stanchions 52 are rigidly secured to the base flange 62. As will be noted in FIGS. 4 and 9, each lift section 42 is provided with two stanchions 52, which are laterally offset from each other and are adapted to straddle the intervening transverse partition 50. Each of the stanchions 52 is of a hollow construction and is provided with a base pad 64 at the bottom thereof sealing the stanchion and providing a liquid tight interior. The exterior surface of the stanchion 52 can be provided with a protective coating so as to prevent corrosive attack of the stanchions by the acidic or alkaline solutions which may be contained in the treating receptacles. Protective coatings suitable for this purpose are well known in the art and include vinyl resins and highly fluorinated polymeric hydrocarbons such as, for example, polytetrafluoroethylene.

The fixed conveyor sections 40 are similarly comprised of a U-shaped channel member 58 having a pair of upstanding side flanges 60 having their lower edges rigidly affixed to the horizontal base flange 62. The channel members 58 of the fixed conveyor sections are of a series of standard lengths and are adapted to span the distance between adjacent ones of the lift sections 42. In installations where the span between adjacent lift sections 42 is not excessive, the channel member 58 of the fixed conveyor section can be suitably supported by the stanchions 52 of the lift sections 42. However, in arrangements wherein the adjacent lift sections are disposed at a substantial distance such as over a multiple station treating receptacle having a large number of treating stations therein, one or more stanchions 52 similar to those employed in the lift sections 42 can be disposed intermediate the ends of the fixed conveyor section for supporting the intermediate portion thereof. The ends of the fixed conveyor sections are rigidly secured to the correspondingly shaped load and unload end portions of the adjacent lift sections by either bolting, welding, or the like, depending on the permanency of the installation.

Figure 9:
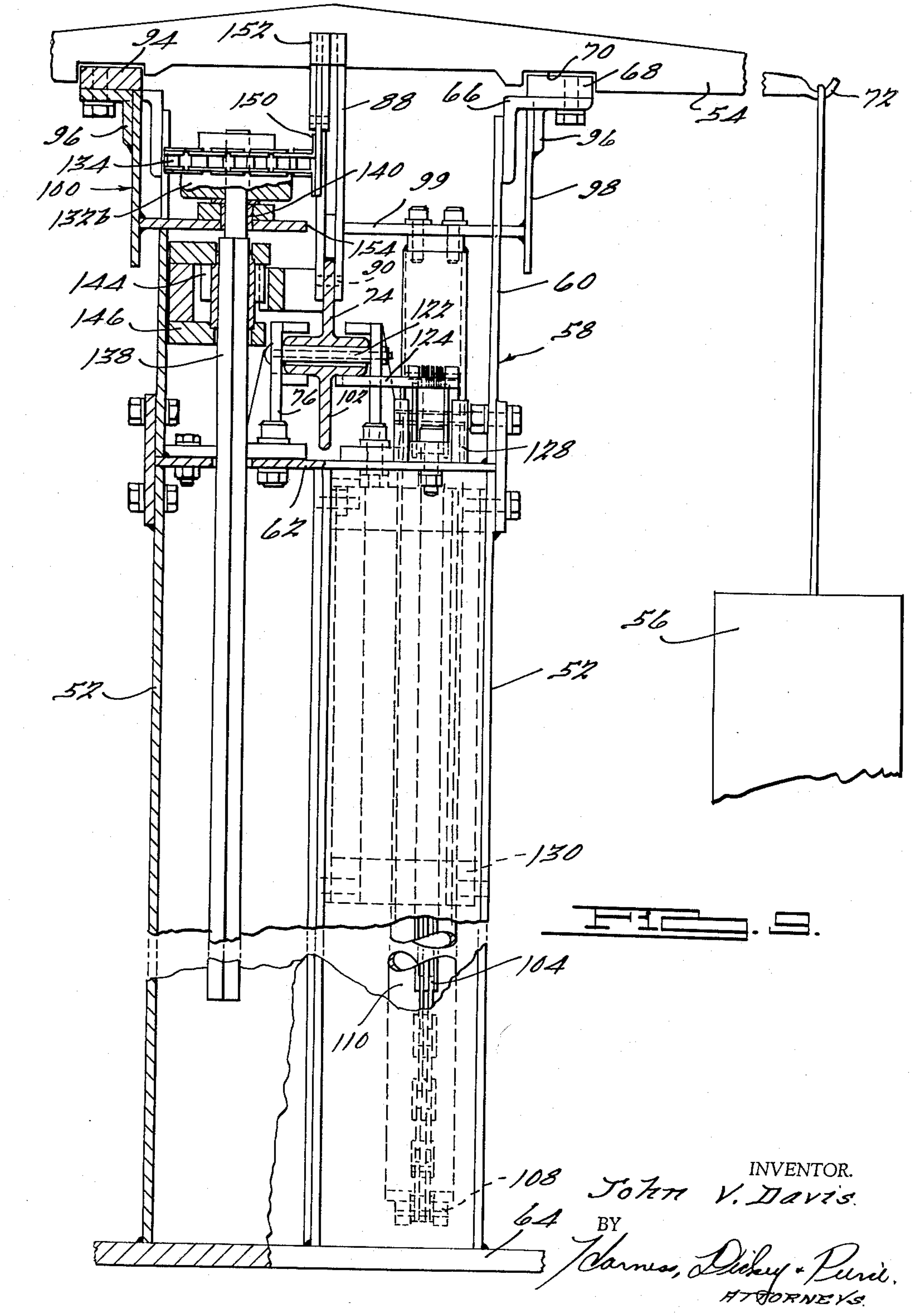
FIG. 9 is a transverse vertical sectional view through the lift section shown in FIG. 4 and taken substantially along line 9—9 thereof through the stanchion in which the slide shaft of the auxiliary pusher mechanism of the lift section is disposed.

Along the upper outer end portions of each side flange 60 of the fixed conveyor sections and the load and unload end portions of the lift conveyor sections, a longitudinal angle iron track support member 66 is rigidly secured having a fixed supporting rail 68 securely fastened to the upper surface thereof forming therewith a track. The work carriers, such as the work carriers 54 shown in FIG. 8 extend transversely of the track or supporting rails 68 and are provided with a recess 70 for slideably engaging each of the supporting rails 68. In the specific conveying machine shown in the drawings, each of the ends of the work carriers 54 as may be best seen in FIG. 9, is provided with an engaging hook 72 from which the work racks 56 are suspended as they sequentially travel through the treating receptacles.

Figure 7:
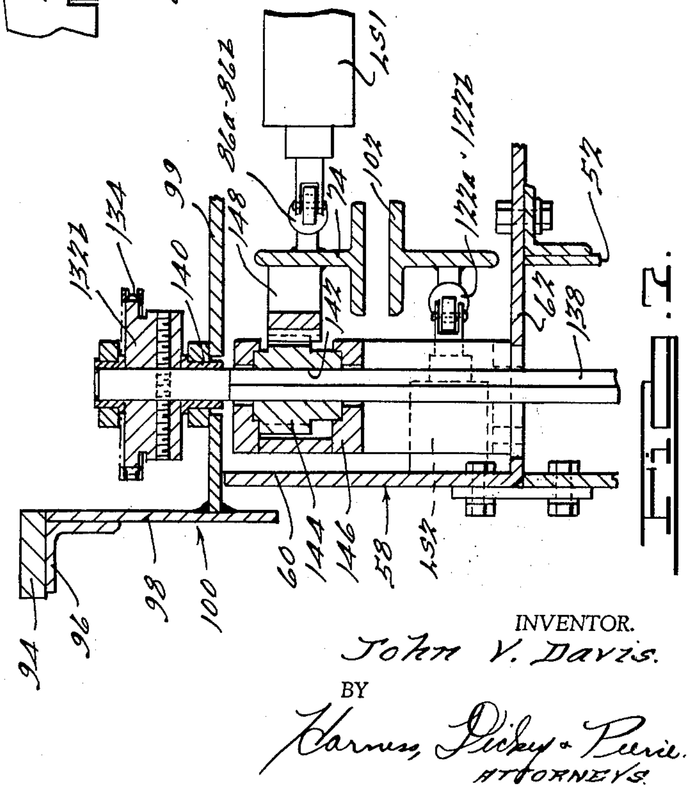
FIG. 7 is a fragmentary transverse vertical sectional view taken through the upper portion of the lift section shown in FIG. 5 and taken along the line 7—7 thereof and showing in particular the auxiliary pusher mechanism along the movable rail.
Figures 6, 10, 11:
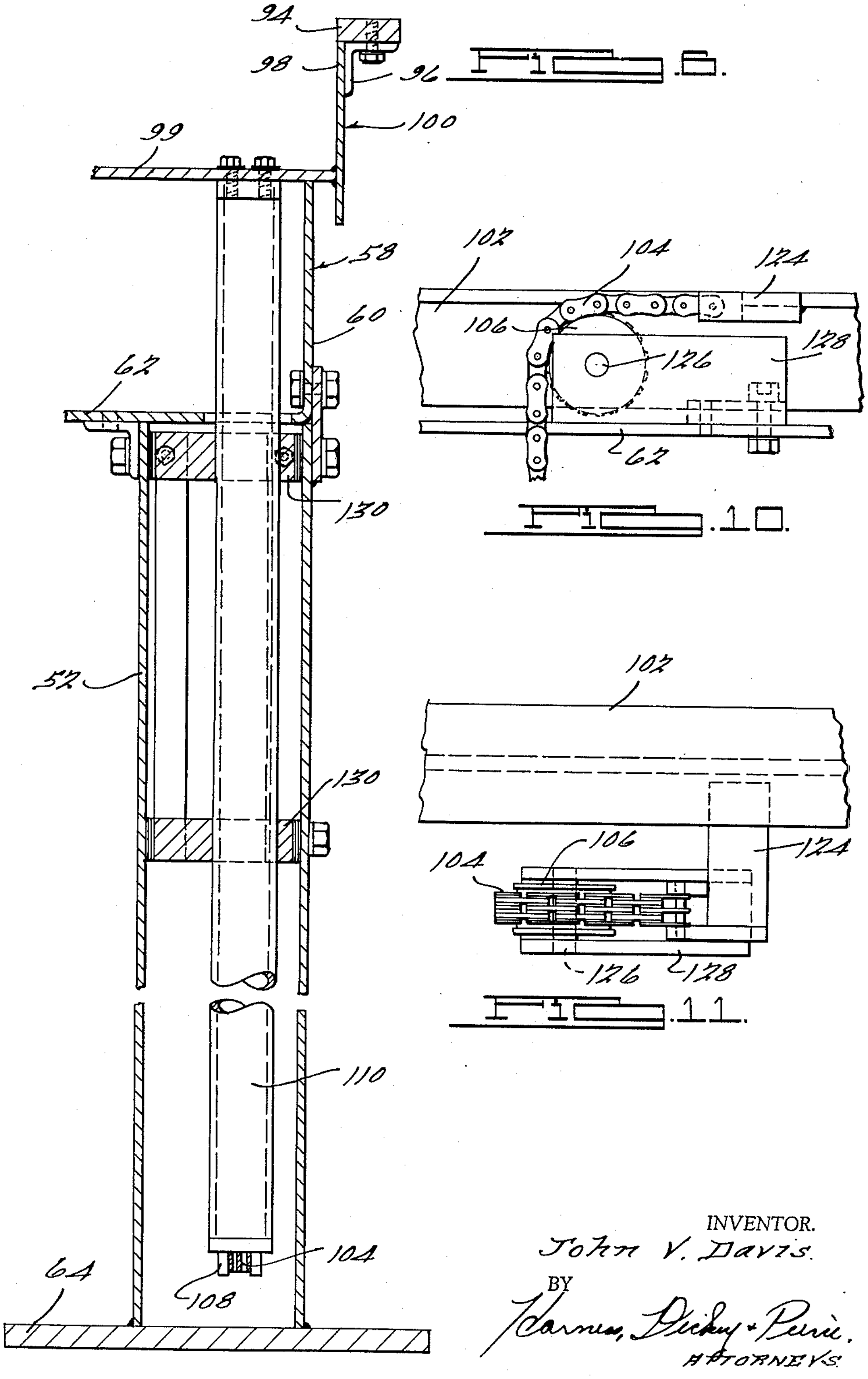
FIG. 10 is an enlarged fragmentary side elevation view of the lift bar and lift chain trained over a lift sprocket.
FIG. 11 is a fragmentary plan view of the lift bar and lift chain arrangement shown in FIG. 10.

The work carriers 54 are intermittently advanced along the supporting rails 68 of the fixed conveyor sections 40 and the load and unload ends of the lift sections 42 by a reciprocable pusher mechanism comprising a pusher bar 74 having a T-shaped cross section which extends substantially through the lateral center of the channel member 58 and is movably supported in guide shoes 76 disposed at longitudinally spaced intervals and affixed to the base flange 62 of the channel member 58. Reciprocation of the pusher bar 74 to and from a retracted position and an advanced position is achieved, for example, by a double acting fluid actuated power or transfer cylinder 78 having the closed end thereof secured to a bracket 80 affixed to the side flange 60 of the channel member 58 as shown in FIG. 8, and having a piston rod 82 thereof detachably secured to an ear 84 connected to the side of the upstanding web of the pusher bar 74. The transfer cylinder 78 is preferably located in a power section of the sectionalized conveyor machine having a construction similar to the fixed conveyor sections 40 and may be conveniently disposed at any point between the lift sections 42. The reciprocating travel of the pusher bar 74 between the advanced and retracted positions can be suitably controlled by a limited switch LS1 disposed longitudinally of the pusher bar 74 as shown in FIG. 7 and adapted to be tripped by actuators **86*a*, 86*b*, adjustably affixed to the pusher bar 74** when it attains the fully advanced and fully retracted positions, respectively.

A series of pushers 88 are pivotally mounted at spaced intervals on a pivot pin 90 extending through the upstand-web portion of the pusher bar 74. The pushers 88 project upwardly therefrom so as to engage the work carriers 54 at substantially the middle thereof as shown in FIGURE 8. The pushers 88 are pivotable about the pivot pin 90 to an inoperative position as shown in phantom in FIGURE 4 when the pusher contacts a work carrier 56 during the retracting movement of the pusher bar. The pushers 88 are provided with a stop pin 92, adapted to engage the upper edge of the web of the pusher bar 74 during the advancing movement of the pusher bar preventing the pusher 88 from pivoting at this time. Accordingly, the work carriers 54 are intermittently advanced along the supporting rails 68 by the pusher mechanism hereinabove described until they reach the last station of a tank or treating receptacle at which time they must be raised in order to enable the work carrier and the work racks suspended therefrom to be transferred over a transverse partition 50 separating adjoining treating receptacles.

The elevation of the work carriers and the work racks thereon are achieved by the lift sections 42, having movable supporting rail sections 94 thereon which are alignable with the fixed supporting rail sections 68 at the load and unload end portions of the lift sections. The movable rail sections 94 as shown in FIGURES 7 and 9, are rigidly affixed to track support members 96 which are secured to the sides of a pair of upstanding flanges 98 of a shallow U-shaped lift frame 100 including a base flange 99 extending between and affixed to the lower edges of the upstanding flanges 98. To accommodate the lift frame 100, the side flanges 60 of the channel member 58 between the load and unload ends of the lift section, are cut away and the upper edge portions thereof provide a bearing surface on which the lift frame 100 rests when in the fully lowered position.

Figure 4:
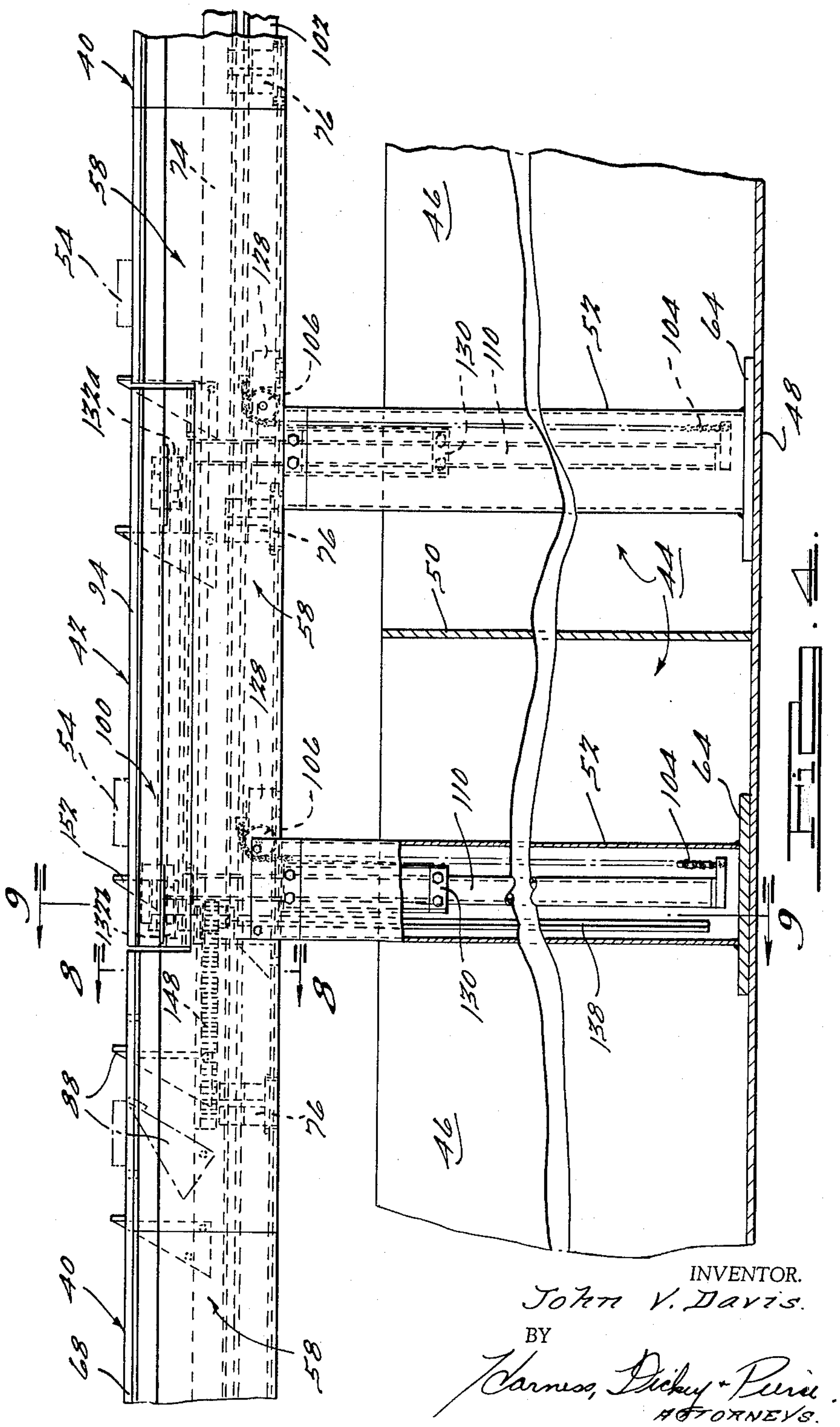
FIG. 4 is an enlarged fragmentary side elevation view partly in section of one of the lift sections shown in FIGS. 1 to 3.
Figure 5:
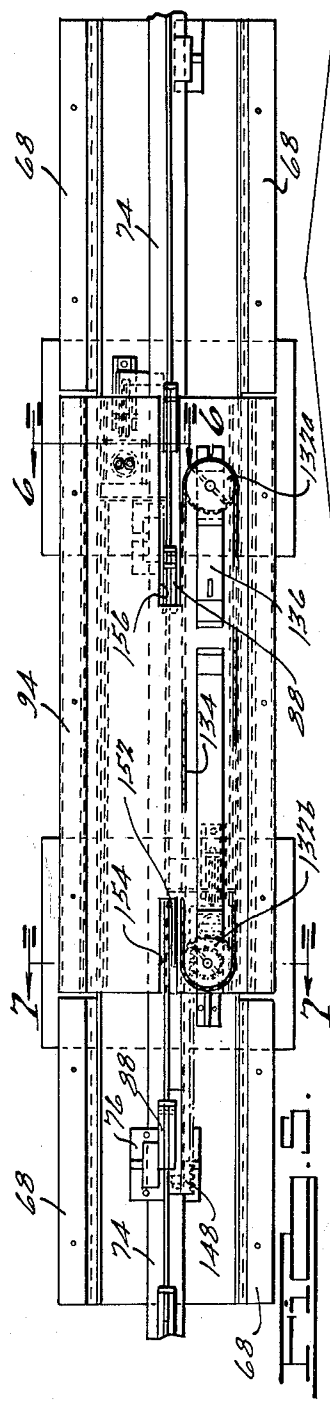
FIG. 5 is a plan view of the lift section shown in FIG. 4.
Figure 6:
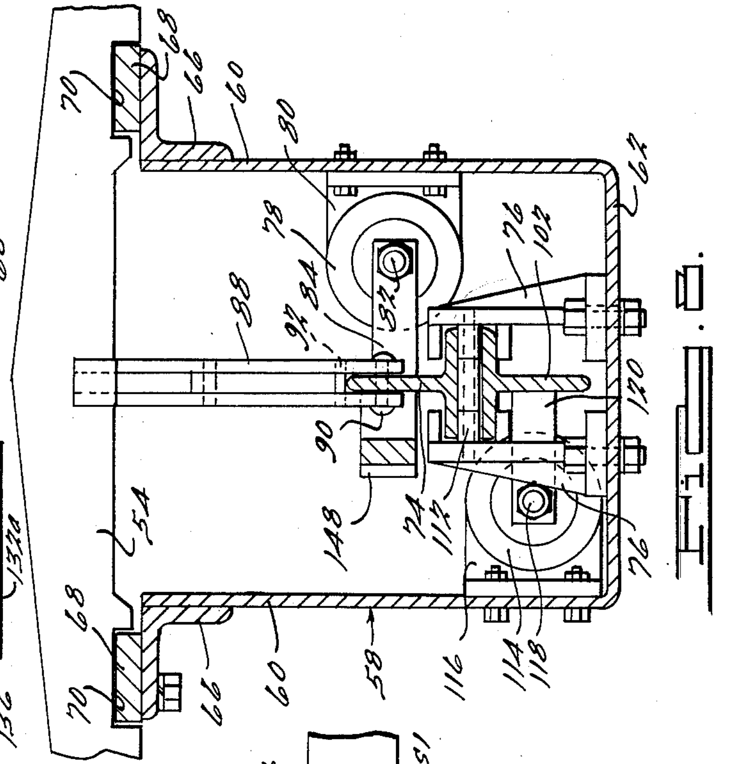
FIG. 6 is a transverse vertical sectional view through a portion of the stanchion and movable rails shown in FIG. 5 and taken along line 6—6 thereof.

Movement of the lift frame 100 to and from a lowered position and a raised position can be achieved by a number of suitable mechanisms including a double acting lift cylinder, a rack and pinion lift mechanism, but preferably by a coordinated reciprocable lift mechanism as hereinafter described. The specific lift mechanism shown in the drawings comprises a reciprocable lift bar 102 having a pair of flexible elements such as lift chains 104 connected thereto and which lift chains are trained over sprockets 106 and extend therefrom down into the stanchions 52. The end of each of the lift chains 104 is connected to a mounting bracket 108 affixed to the lower end of a slide tube 110 slidably disposed in each of the stanchions 52 and having the upper ends thereof affixed to the base flange 99 of the lift frame 100. As shown in FIGURES 4 to 6, each of the slide tubes 110 is guidably supported in slide bearings 130 affixed to the interior of the stanchions 52. The employment of two slide tube and lift chain assemblies for each lift section provides for uniform lifting of the lift frame 100, minimizing any skewing or twisting thereof during its ascending and descending movement.

The lift bar 102 is slideably mounted in the guide shoes 76 directly below the pusher bar 74 and is separated therefrom by a suitable antifriction roller 112. Reciprocation of the lift bar 102 is achieved in a manner similar to that of the pusher bar 74 and includes a double acting fluid actuated lift cylinder 114 which can be conveniently mounted in the power section of the sectionalized conveying machine adjacent to the transfer cylinder 78 as may be best seen in FIGURE 8. The closed or blank end of the lift cylinder 114 is connected to a bracket 116 secured to the side flange 60 of the channel member 58. A piston rod 118 of the lift cylinder 114 is adjustably secured to a mounting ear 120 securely fastened to the side surface of the depending web of the lift bar 102. The reciprocating travel of the lift bar 102 to and from a retracted position and an advanced position is controlled in a manner similar to that of the pusher bar 74 and includes a lift control limit switch LS2 disposed longitudinally of the lift bar 102 as shown in FIGURE 7. Limit switch LS2 is adapted to be tripped by actuators **122*a*, 122*b*** adjustably affixed to the depending web of the lift bar when the fully advanced and fully retracted positions are obtained respectively.

The reciprocating movement of the lift bar 102 causes the lift chains 104 to move the slide tubes 110 to and from a raised position and a lowered position whereby the lift frame 100 and the work carriers thereon are elevated and lowered. The lift chain 104 as may be best seen in FIGURES 10 and 11, has one end thereof securely fastened to a chain mounting bracket 124 rigidly affixed to and projecting laterally of the lift bar 102. The sprocket 106 is rotatably mounted on a shaft 126, having the ends thereof supported in a U shaped bracket 128, which is securely fastened to the base flange 62 of the channel member 58. As the lift bar is advanced from the retracted position shown in FIGURES 10 and 11, the vertical pulling action of the lift chains on the mounting brackets 108 affixed to the lower ends of the slide tubes 110, causes the slide tubes and lift frame 100 mounted at the upper ends thereof to move to a raised position.

To provide for the advancement of the work carriers 54, from the input or load end portion of the movable rail sections 94 to the output or unload end portion thereof when the lift frame 100 is in the raised position, an auxiliary pusher mechanism is incorporated in each lift section which in the specific conveyor shown in the drawings, is operatively connected to the principal pusher mechanism. The auxiliary pusher mechanism, as may be best seen in FIGS. 4, 5, 7, and 9, is comprised of a pair of longitudinally spaced sprockets 132*a*, 132*b* having a continuous flexible element such as a transfer chain 134 trained thereover and extending therearound. The idler sprocket 132*a* is rotatably mounted on a longitudinally adjustable supporting bracket 136 secured to the upper surface of the base flange 99 of the lift frame 100. The driving sprocket 132*b* is affixed to the upper end of a vertical shaft 138 rotatably mounted in a bearing 140 mounted on the base flange 99 and extending downwardly therefrom into the stanchion 52 below. The portion of the shaft 138 beneath the bearing 140 is of a square or splined configuration and is slidably and engageably disposed in a correspondingly contoured bore 142 extending axially through the center of a pinion gear 144 rotatably mounted in a bearing block 146 secured to the base flange 62. The pinion gear 144 is disposed adjacent to a gear rack 148 affixed to the side of the upstanding web of the pusher bar 74 and is disposed in constant meshing engagement therewith. Accordingly, as the pusher bar 74 is advanced and retracted, the coaction between the gear rack 148 and the pinion gear 144 causes the vertical shaft 138 to rotate which in turn drives the driving sprocket 132*b* affixed to the upper end thereof and causing the transfer chain 134 to move through a path longitudinally of the movable rail sections 94. When the lift frame is elevated to the raised position, the vertical shaft 138 slides upwardly in the bore 142 of the pinion gear 144 and remains in constant engaging relationship therewith.

A link of the transfer chain 134 of the auxiliary pusher mechanism is provided with a mounting clip 150 on which an auxiliary pusher 152 is pivotally mounted. The pivoting movement of the auxiliary pusher 152 enables it to be retracted beneath a work carrier in the same manner as the pushers 88 of the principal transfer mechanism. A suitable stop associated with the pusher 152 and mounting clip 150 prevents the auxiliary pusher from pivoting during the advancing movement thereof. The auxiliary pusher 152 is moved by the transfer chain 134 longitudinally between the movable rail sections 94 to and from a retracted position adjacent the load end portion of the lift frame to an advanced position adjacent the unload end portion of the lift frame. The length of travel of the auxiliary pusher 152 is substantially equal to the distance between the central axes of the sprockets 132*a*, 132*b*. In order that a work carrier 54 can be advanced by a pusher 88 of the principal pusher mechanism from the adjacent fixed conveyor section to a position on the movable rail sections 94 beyond the center axis of the driving sprocket 132*b* whereby the work carrier can be engaged by the auxiliary pusher 152, the base flange 99 of the lift frame 100 is provided with a longitudinal slot 154 extending inwardly from the load end portion thereof as shown in FIG. 5 to enable the pusher 88 to advance the work carrier beyond the load end portion of the lift frame 100. Similarly, the unload end portion of the lift frame is provided with a similar longitudinal slot 156 enabling the next adjacent pusher 88 of the principal pusher mechanism to retract to a position rearwardly of the center of the idler sprocket 132*a* in order to engage a work carrier that has been advanced by the auxiliary pusher mechanism and transfer that carrier off the lift frame to the next station on the fixed conveyor section.

In accordance with the embodiments of the advancing mechanism hereinabove described, the auxiliary pushers 152 operate in unison with the pushers 88 of the principal pusher mechanism to successively and uniformly advance the work carriers along the fixed conveyor sections 40 and lift sections 42 of the sectionalized conveying machine.

Figure 2:
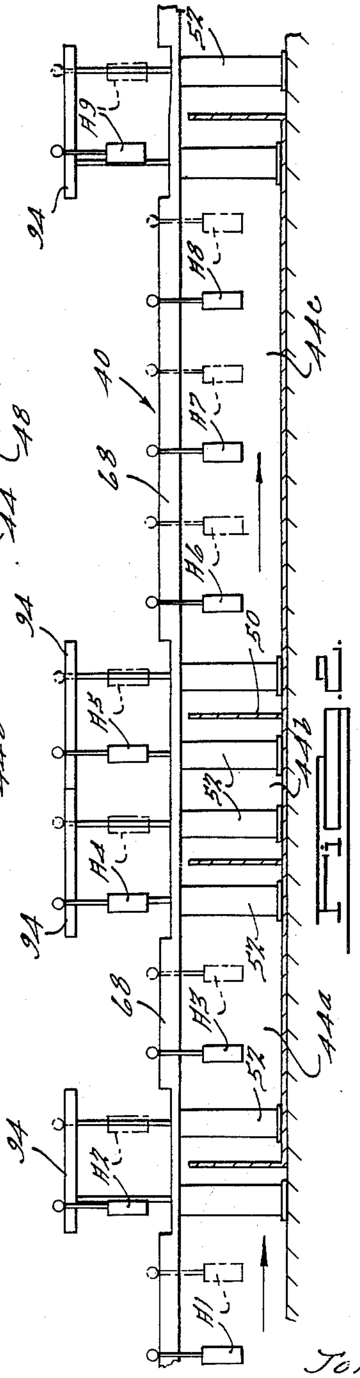
Figure 3:
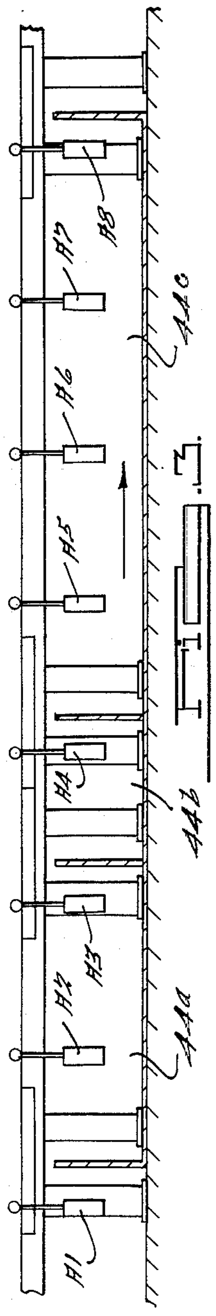

The operating sequence of the sectionalized conveying machine hereinabove described, is best illustrated in FIGURES 1, 2, 3, which shows a typical arrangement of the fixed conveyor sections 40 and lift conveyor sections 42 in relation to a series of treating receptacles 44*a*, 44*b* and 44*c*. As will be noted, the lift sections 42 straddle each of the transverse partitions 50 separating adjoining treating receptacles in order that the work carriers 54 and the work racks A1 to A9 suspended therefrom, can be elevated and transferred over the partitions 50. The sectionalized conveying machine is shown in FIGURE 1 at the completion of the advancing movement of the pusher bar and during which movement the work carriers having work racks A2, A4, A5 and A9 have been advanced to a position on the load end portion of the movable rail sections 94 of the lift sections 42.

At the completion of the advancing movement of the pusher bar as signaled by the actuation of the transfer control limit switch LS1 by the actuator 86*a* the control circuit of the conveying machine energizes the lift cylinder 114, which causes the lift bar 102 to move from the retracted to the advanced position and during which movement the movable rail sections 94 of the lift sections are moved from a lowered position shown in FIGURE 1 to the raised position as shown in FIGURE 2. During the elevating movement of the movable rail sections 94, the pusher bar 74 is retracted by the transfer cylinder 78 until the fully retracted position is attained whereby the actuator 86*b* trips the transfer control limit switch LS1 which deactuates the transfer cylinder. When the movable rail sections 94 have attained the fully elevated position lift control limit switch LS2 is actuated by the actuator 122*a* on the lift bar 102 which deactuates the lift cylinder 114 and simultaneously signals the control circuit that the work carriers are now in position to be advanced. Accordingly, the transfer cylinder 78 is actuated causing the pusher bar 74 to move from its retracted position to its advanced position whereby the work racks A1, A3, A6, A7 and A8 are advanced from the position shown in solid lines to the position shown in phantom in FIGURE 2 to the next station along the fixed supporting rail 68. During the same time the auxiliary pusher 152 on the lift sections advance the work racks A2, A4, A5 and A9 along the elevated movable rail sections 94 from the positions shown in solid lines over the transverse partitions 50 to the positions shown in phantom above the next stations of the adjoining treating receptacles.

When the pusher bar 74 attains the fully advanced position, transfer control limit switch LS1 is actuated by actuator 86*a* which deactuates the transfer cylinder 78 and simultaneously signals the control circuit of the conveying machine that the work carriers are in appropriate position whereby the movable rail sections 94 can be lowered. Accordingly, the lift cylinder 114 and transfer cylinder 78 are actuated whereby the lift bar 102 and the pusher bar 74 commence their retracting movements respectively. When the pusher bar 74 attains the fully retracted position, transfer cylinder 78 is deactuated by the tripping of limit switch LS1 by actuator 86*b*. Similarly when the lift bar 102 attains the fully retracted position, the lift cylinder 114 is deactuated when limit switch LS2 is actuated by actuator 122*b*. Accordingly, the movable rail sections 94 are lowered from the raised position shown in FIGURE 2 to the lowered position whereby the work racks A2, A4, A5 and A9 are immersed in the treating receptacles below.

The tripping of limit switch LS2 by the actuator 122*b* on the lift bar 102 is also effective to energize a suitable down dwell timer in the control circuit of the conveying machine which commences to time a predetermined down dwell period. At the expiration of the down dwell period, the down dwell timer signals the control circuit which energizes the transfer cylinder 78 causing each of the work carriers and work racks suspended therefrom to be advanced along the movable rail sections 94 and fixed rail sections 68 to the next adjacent treating station.

When the pusher bar 74 attains the fully advanced position, transfer control limit switch LS1 is tripped by actuator 86*a* which again signals the control circuit of the conveying machine that the movable rail sections 94 can now be elevated. The position of the work carriers at the completion of the advancing movement of the pusher mechanism is illustrated in FIGURE 3 wherein the work carriers having work racks A1, A3, A4 and A8 suspended therefrom, will be lifted by the lift sections and transferred over the partitions 50 in accordance with the cycle hereinabove described.

In the foregoing operating sequence as illustrated in FIGURES 1 to 3, each of the work carriers 50 is spaced a distance equivalent to two treating stations from the next adjacent work carriers or alternatively are separated at one station intervals equivalent to two advancing strokes of the principal pusher mechanism. An alternate satisfactory operating sequence to that heretofore described is achieved by reversing the direction of the auxiliary pushers 152 relative to the principal pushers 88. This can be achieved by incorporating a reverse idler gear (not shown) between the pinion gear 144 and gear rack 148 of the auxiliary pusher mechanism whereby the direction of rotation of the driving sprocket 132*b* is reversed. Accordingly, the transfer chain 134 and auxiliary pusher 152 thereon is retracted during the advancing movement of the pusher bar 74 and is advanced when the pusher bar 74 is retracted.

Figures 27, 28:
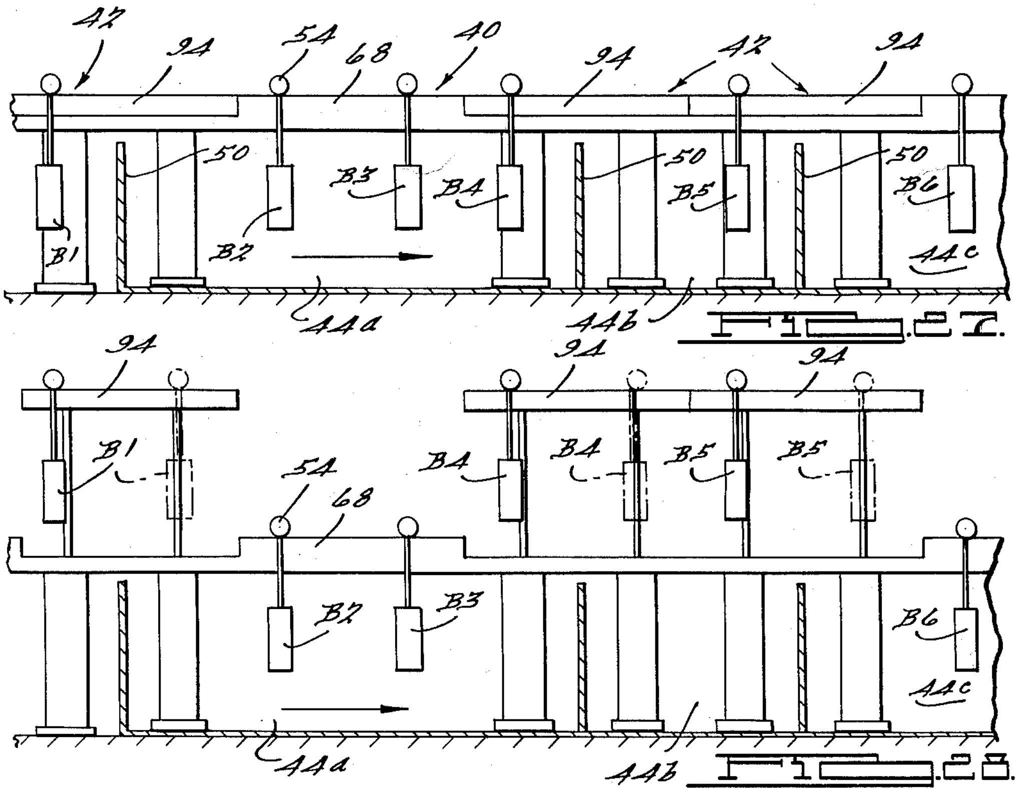
FIGS. 27 to 29 are fragmentary side elevation views showing the operating sequence of the conveying machine utilizing a reverse movement pusher mechanism along the movable rails of the lift sections.
Figure 29:
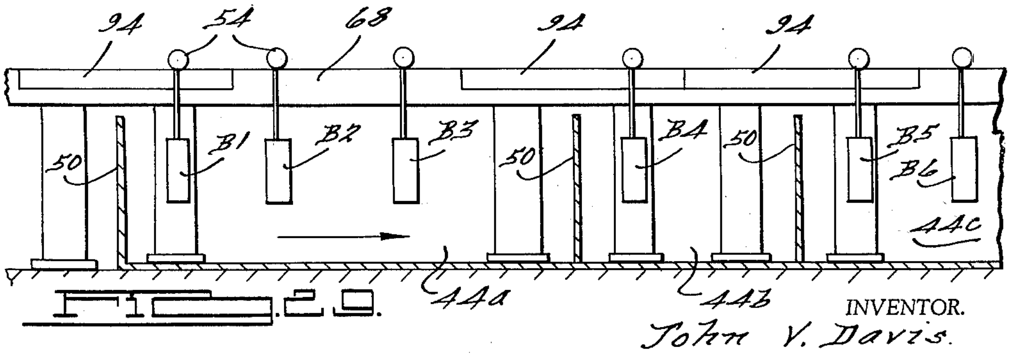

The reversal of the auxiliary pusher mechanism with respect to the principal pusher mechanism enables the advancement of the work carriers along the conveyor machine with only half the number of actuating movements of the transfer cylinder 78 in comparison to that formerly required. A typical operating sequence of the reverse direction auxiliary pusher mechanism is shown in FIGURES 27 to 29 which illustrate only a portion of the sectionalized conveying machine shown in FIGURES 1 to 3. The conveying machine is shown in FIGURE 27 at the completion of the advancing movement of the pusher bar whereby the work racks B1, B4 and B5 have been advanced from the fixed rail sections 68 to a position on the loading end portion of the movable rail sections 94 of the lift sections 42. At the completion of the advancing movement of the pusher bar, transfer limit switch LS1 is tripped by the actuator 86*a* which signals the control circuit of the conveying machine causing the lift cylinder 114 to be actuated, which in turn moves the movable rail sections 94 from the lowered position as shown in FIGURE 27 to the raised position as shown in FIGURE 28. During the elevating movement of the movable rail sections, the pusher bar remains in the fully advanced position. At the completion of the lifting movement of the lift bar 102, limit switch LS2 is tripped by actuator 122*a* which signals the control circuit of the conveying machine and actuates the transfer cylinder 78 causing the pusher bar 74 to commence its retracting movement. During the retracting movement of the pusher bar the auxiliary pusher mechanism in each of the lift frames moves through its advancing stroke whereby the work racks B1, B4 and B5 are advanced from the position shown in solid lines in FIGURE 28 to the position shown in phantom at the unload end portion of the movable rails 94 and above the first station of the multiple station treating receptacles 44*a*, 44*b*, and 44*c*, respectively.

At the completion of the retracting movement of the pusher bar 74, transfer control limit switch LS1 is actuated by the actuator 86*b* which signals the control circuit of the principal conveying machine and which in turn actuates the lift cylinder 114 causing the lift bar 102 to commence its retracting movement whereby the movable rail sections 94 are lowered from the raised position shown in FIGURE 28 to the lower position shown in FIGURE 29. When the lift bar 102 attains the fully retracted position, limit switch LS2 is tripped by actuator 122*b* which energizes a suitable down dwell timer as hereinbefore described which commences to time a predetermined down dwell period. At the completion of the down dwell period, the down dwell timer signals the control circuit of the conveying machine which actuates the transfer cylinder 78 whereby the pusher bar commences its advancing movement and the work racks B1, B4 and B5 are advanced off the unload end portion of the movable rail sections 94. During the same movement of the pusher bar 74, the work racks B3 and B4 are advanced to a position on the load end portions of the next adjacent movable rail sections 94 and the auxiliary pusher mechanisms are moved from the advanced to the retracted position preparatory to the next operating step as heretofore described.

Figure 12:
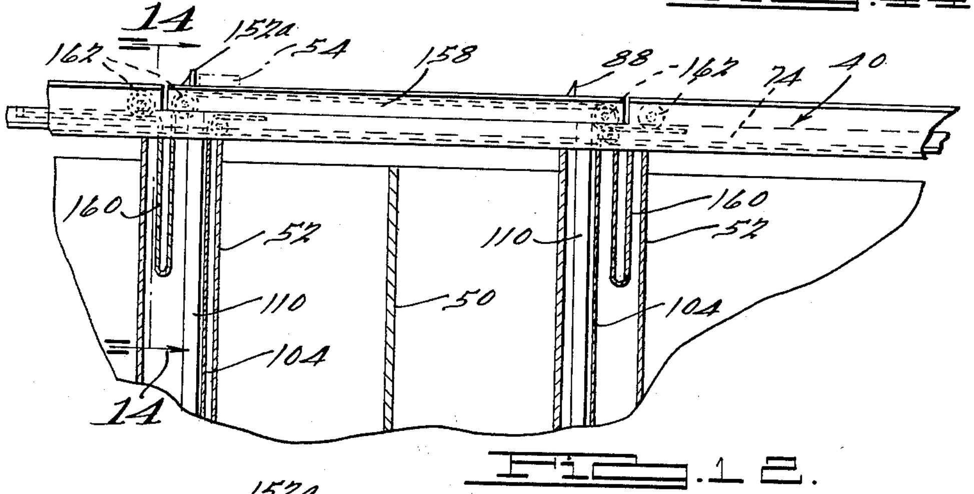
FIG. 12 is a side elevation view illustrating an alternate satisfactory modification of the lift section auxiliary pusher mechanism and showing the movable rail in the lowered position.
Figure 13:
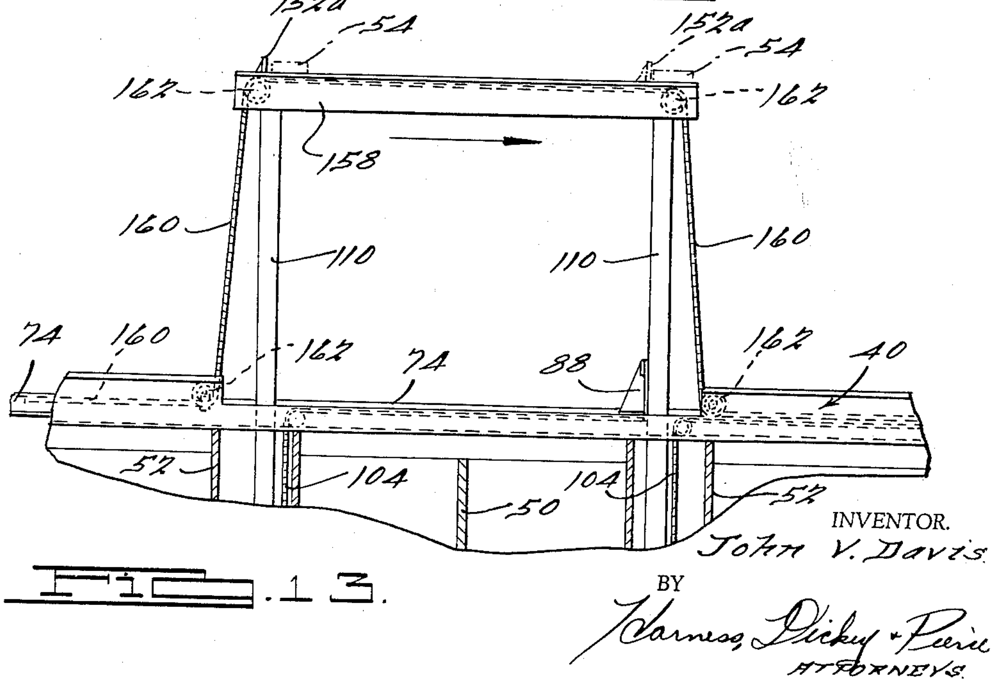
FIG. 13 is a side elevation view of the auxiliary pusher mechanism of the lift section shown in FIG. 12 and illustrating the movable rail in the raised position.
Figure 14:
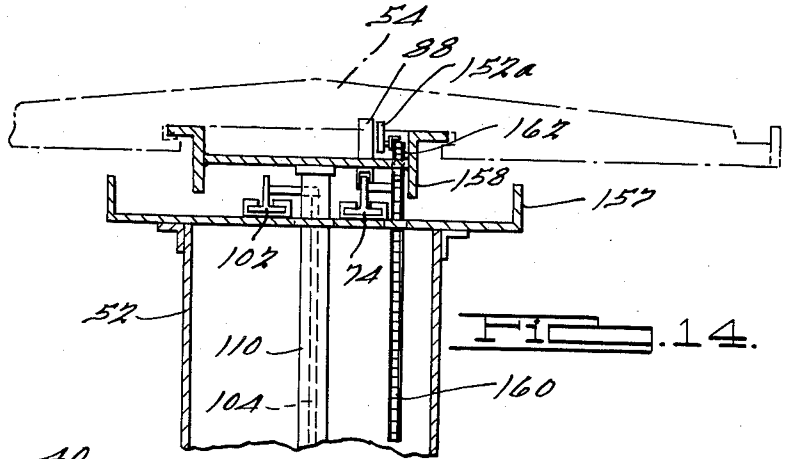
FIG. 14 is a fragmentary transverse sectional view of the pusher mechanism shown in FIG. 12 and taken along line 14—14 thereof.

An alternate satisfactory auxiliary pusher mechanism for the lift section 42 is shown in FIGURES 12 to 14. The drawings also illustrate an alternate upper frame construction which is of a shallow design in comparison to that heretofore shown and described and enables placement of the pusher bar 74 and lift bar 102 in side by side relationship. The wide, shallow-type construction as shown in the drawings, and particularly in FIGURE 14, comprises a shallow-type channel member 157 and a wide, shallow lift frame 158 which further reduce the head room requirement and increase the accessibility to the pusher and lift mechanisms facilitating their maintenance and inspection. Raising and lowering of the wide shallow lift frame 158 is achieved in the same manner as hereinbefore described, utilizing the slide tubes 110 having the lower ends thereof connected to the lift chains 104 which on reciprocation of the lift bar 102 are effective to raise and lower the lift frame. In lieu of the rack and pinion drive for the auxiliary pusher mechanism as shown in the preceding drawings, the modified auxiliary pusher mechanism shown in FIGURES 12 to 14, employs a transfer chain 160 having the ends thereof connected to the pusher bar 74 and which chain is trained over a series of four sprockets 162 rotatably mounted on the fixed conveyor sections adjacent to the lift frame and at the load and unload end portions of the lift frame as shown in FIGURES 12 and 13. When the lift frame 158 is in the lowered position as shown in FIGURE 12, the transfer chain 160 extends downwardly in a loop fashion in each of the stanchions 52. When the lift frame 158 is elevated to the raised position, the transfer chain 160 is trained tightly over the sprockets 162 in a manner as shown in FIGURE 13 whereby reciprocation of the pusher bar 74 to and from a retracted position and an advanced position causes the transfer chain to undergo a corresponding movement.

The transfer chain 160 is provided with an auxiliary pusher 152*a* of the same type as the auxiliary pusher 152 employed in the auxiliary transfer mechanism heretofore described, which is pivotally mounted thereon and reciprocable thereby from a retracted position adjacent the load end portion as shown in solid lines in FIGURE 13 to an advanced position adjacent to the unload end portion of the lift frame 158. The advancement of the auxiliary pusher 152*a* from the retracted to the advanced position is effective to transfer a work carrier 54 as shown in phantom in the drawings from the load end portion of the lift frame 158 to the unload end portion of the lift frame and in which position the pusher 88 on the pusher bar 74 can engage the work carrier when the lift frame is again lowered. In view of the fact that the advancing stroke of the auxiliary pusher 152*a* coincides with the advancing stroke of the pusher bar 74 and the pushers 88 thereon, the operating sequence of the modified mechanism is identical to the operating sequence hereinbefore described in connection with FIGURES 1 to 3.

Figures 15, 16:
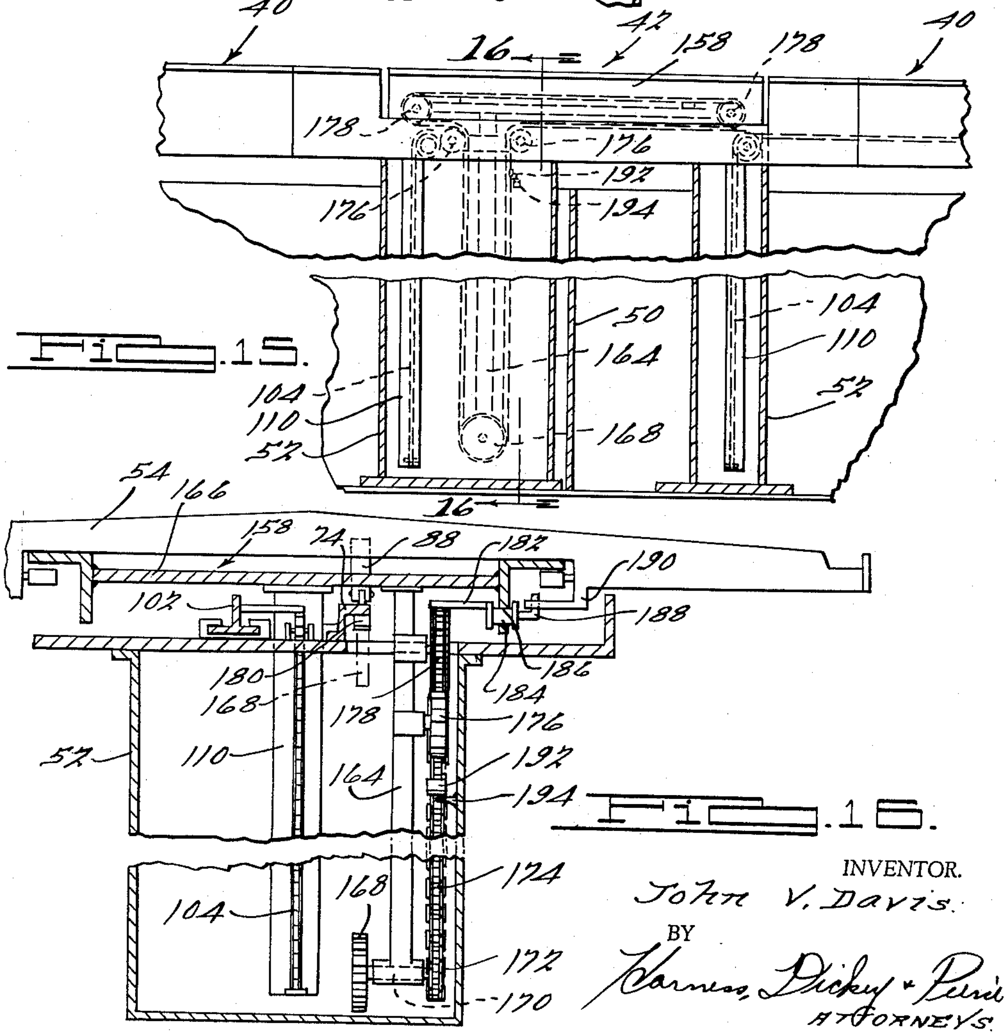
FIG. 15 illustrates still another alternate satisfactory modification of the auxiliary pusher mechanism for the lift section.
FIG. 16 is a fragmentary transverse vertical sectional view of the pusher mechanism shown in FIG. 15 and taken along the line 16—16 thereof.

Still another alternate satisfactory modification of the auxiliary pusher mechanism for the lift sections is shown in FIGURES 15 and 16. The wide type lift frame 158 is employed and is raised and lowered by the pair of slide tubes 110 and lift chains 104 responsive to the reciprocation of the lift bar 102 in the same manner as heretofore described. The auxiliary pusher mechanism is comprised of an upright frame 164 having the upper end portion thereof secured to a web flange 166 of the movable lift frame 158. A pinion gear 168 is affixed to one end of a shaft 170 rotatably journaled in the lower end of the upright frame 164. A drive sprocket 172 is affixed to the other end of the shaft 170 over which an auxiliary transfer chain 174 is engageably trained. The auxiliary transfer chain 174 extends upwardly from the drive sprocket 172 and is trained over a pair of idler sprockets 176 rotatably mounted at the upper end portion of the upright frame 164 and from which sprockets it extends longitudinally in a continuous manner and is trained over a second pair of idler sprockets 178 rotatably mounted at the upper and outer ends of the upright frame 164 adjacent to the load end and unload end portions of the lift frame 158.

The entire auxiliary pusher mechanism including the upright frame 164, the sprockets 176, 178, and auxiliary transfer chain 174 mounted thereon, is movable with the lift frame 158 to and from a raised position and a lowered position. The auxiliary pusher mechanism and lift frame is shown in the lowered position in FIGURES 15 and 16 wherein the upright frame 164 extends downwardly into the stanchion 52. When the lift frame 158 is moved to the raised position, the pinion gear 168 is raised to the position shown in phantom in FIGURE 16, wherein it is disposed in meshing engagement with a gear rack 180 affixed to and depending from the pusher bar 74. Accordingly, reciprocation of the pusher bar 74 from the retracted to the advanced position is effective to cause the auxiliary transfer chain 174 to move longitudinally of the lift frame 158. A clip 182 is affixed to a link of the auxiliary transfer chain 174 and extends laterally therefrom and is connected to a roller 184 movably and guidably disposed in a longitudinal slot 186 through the depending flange of the lift frame 158. An auxiliary pusher 188 is pivotally secured to the outward side of the roller 184 and is adapted to contact a projecting finger 190 on the work carrier 54.

The auxiliary pusher 188 is advanced by the auxiliary transfer chain 174 from a retracted position adjacent to the load end portion to an advanced position adjacent to the unload end portion of the lift frame 158 by the meshing engagement of the pinion gear 168 with the gear rack 180 during the advancing movement of the pusher bar 74. In view of the fact that the pinion gear 168 is disengaged from the gear rack 180 when the lift frame is in the lowered position, retraction of the auxiliary pusher 188 by the pusher bar 74 must be accomplished while the lift frame is in the raised position. Inasmuch as greater efficiency in the operating cycle of the machine is achieved by retracting the pusher bar during the descending and ascending movement of the lift frame, alternate retracting means are employed for retracting the auxiliary pusher 188 which obviates retaining the lift frame 158 in the raised position until the pusher bar 74 has been retracted. The retracting means comprise an engaging member 192 affixed to a link of the auxiliary transfer chain 174 and adapted to contact a stop member 194 affixed to the side wall of the stanchion 52 during the descending movement of the lift frame 158. The coaction between the engaging member 192 and the stop member 194 holds the transfer chain during the descending movement of the lift frame causing the sprockets 176 and 178 to move relative thereto and whereby the auxiliary pusher 188 is moved from the advanced to the retracted position. When the lift frame is raised the auxiliary pusher mechanism is also raised whereby the engaging member 192 is elevated above the stop member 194 enabling subsequent downward movement thereof to a position contiguous to the stop member 194 during the advancing movement of the auxiliary transfer chain 174.

The operating sequence of the auxiliary pusher mechanism shown in FIGURES 15 and 16 with respect to the principal pusher mechanism, is identical to that heretofore described in connection with the operating sequence shown in FIGURES 1 to 3. A reversal in the operating direction of the principal and auxiliary pusher mechanisms can be achieved by incorporating a reversing idler sprocket (not shown) between the pinion gear 168 and the gear rack 180 on the pusher bar whereby the operating sequence described in connection with FIGURES 27 to 29 can be obtained.

The operating function of the sectionalized conveying machine hereinbefore shown and described is effective to automatically and sequentially convey successive work carriers and the work racks supported thereon through a predetermined treating sequence. The sectionalized construction of the conveying machine enables rearrangement of the fixed conveyor sections and lift conveyor sections whenever a major modification of a relatively permanent nature in the treating receptacle arrangement and/or treating sequence is desired. Further flexibility and versatility of the sectionalized conveying machine comprising the present invention is afforded by the incorporation of an overhead engaging rail which enables small deviations in the predetermined treating sequence of the machine without necessitating a rearrangement of the conveyor sections. The overhead engaging rail is particularly adapted to enable the concurrent selective processing of two or more types of work pieces which deviate slightly in their respective treating sequences. Additionally, the overhead engaging rail enables the conveying machine to be utilized for relatively short duration processing runs of workpieces having a treating cycle which deviates slightly from that provided by the principal conveying machine.

Figure 17:
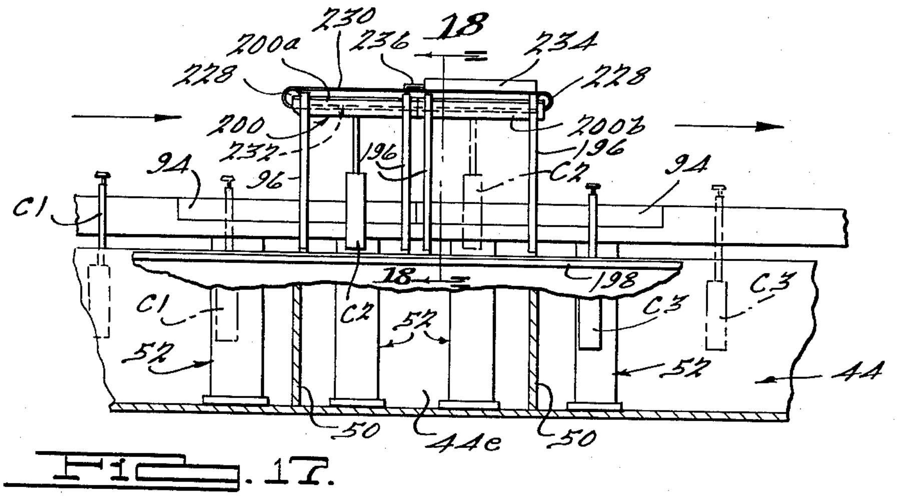
FIG. 17 is a schematic fragmentary side elevation view partly in section of a conveying machine incorporating thereon an overhead engaging rail providing for selective skip operation of the work carriers.
Figure 18:
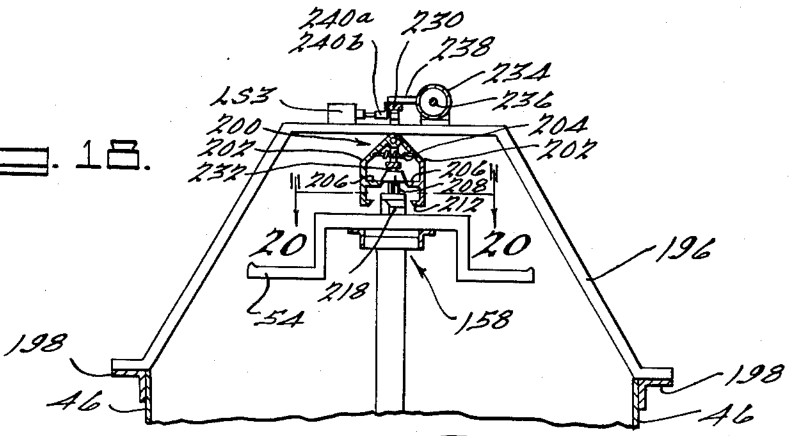
FIG. 18 is a fragmentary transverse vertical sectional view of the overhead engaging rail and framework shown in FIG. 17 and taken along line 18—18 thereof.

A specific arrangement of an overhead engaging rail is shown in FIGURES 17 through 21 which is adapted to provide for selective skip operation of the treating receptacle 44e whereby selected work carriers are retained in the raised position so that the work racks thereon are not immersed in the treating solution. As shown in the drawings, the overhead rail is comprised of a series of upright frames 196 of an inverted U-shaped configuration having their lower leg portions detachably secured to an angle iron reinforcing member 198 affixed to and extending along the upper ends of each of the side partitions 46 of the treating receptacles 44. An engaging rail 200 comprising a pair of pivotally mounted side members 202 is supported at substantially the mid point of the bight portion of the upright frames 196 and are pivotable to and from an inoperative or expanded position to an operative or contracted position. The side members 202 are resiliently biased toward the contracted position by a coil spring 204 extending between and connected to the side members. A suitable stop is incorporated in the pivot connection to prevent movement of the side member 202 toward each other beyond the contracted position as shown in FIGURE 18. Each of the side members 202 is provided with an engaging flange 206 projecting inwardly from the inner side surface thereof and extending longitudinally therealong. When the engaging rail 200 is in the operative or contracted position, the projecting end portions of the engaging flanges 206 are adapted to underlie and slidably support an engaging head 208 rigidly connected to the upper end of a splined shaft 210 affixed to substantially the mid point of the work-carrier 54.

Figures 21, 22:
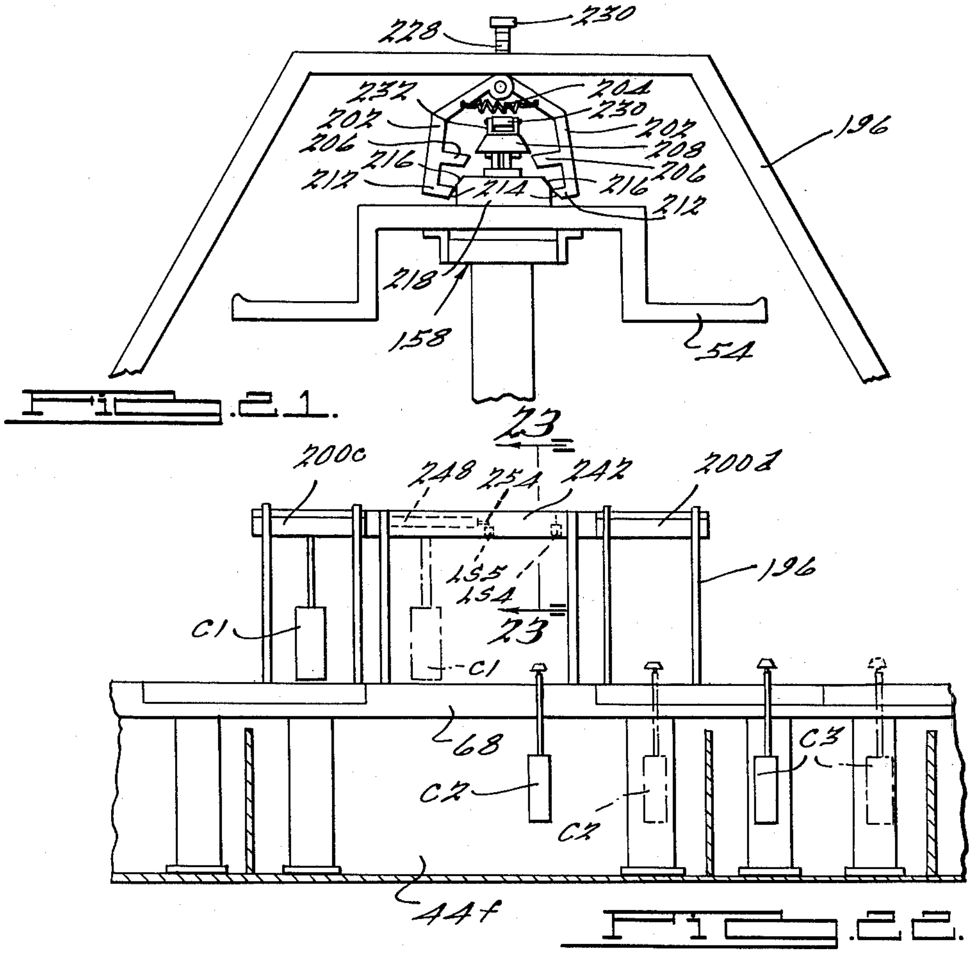
FIG. 21 is a fragmentary side elevation view of the overhead engaging rail held in the disengaged position by the selector cam.
FIG. 22 is a schematic fragmentary side elevation view illustrating the use of the overhead engaging rail to provide for a selective skip operation of a multiple station treating receptacle.

Each of the side members 202 is also provided with a camming flange 212 projecting inwardly from the lower inner side surface thereof and extending longitudinally therealong in spaced substantially parallel relationship to the engaging flange 206. The projecting end portions of the camming flanges 212 are provided with a chamfer 214 inclined inwardly and upwardly which are adapted to coact with a cam surface 216 on a selector cam 218 mounted on the splined shaft 210 directly below the engaging head 208. The selector cam 218 is rotatable on the splined shaft 210 to and from an operative position as shown in phantom in FIGURE 20 to an inoperative position as shown in solid lines. When in the operative position, the cam surfaces 216 on the selector cam 218 are disposed so as to coact with the chamfers 214 on the camming flanges 212 whereby the side members 202 are held in the expanded position as shown in FIGURE 21 in opposition to the biasing forcing of the coil spring 204. When the side members 202 are positioned in the expanded position, the end portions of the engaging flanges 206 are separated by a distance greater than the width of the engaging head 208 as shown in FIGURE 21 whereby the workcarrier is not engaged by the engaging rail. When the selector cam 218 is disposed in the inoperative position, the cam surfaces 216 thereon are disposed out of contact with the chamfers 214 therealong whereby the coil spring 204 maintains the side member 202 in the contracted position.

Selectivity can also be achieved by employing an overhead engaging rail having the side members fixedly disposed in the contracted position and providing only selected work carriers with an engaging head whereby only those carriers are retained in the raised position. However, the greater versatility and processing flexibility provided by the arrangement shown makes the expandable rail section and selector cam combination the preferred embodiment.

Figures 19, 20:
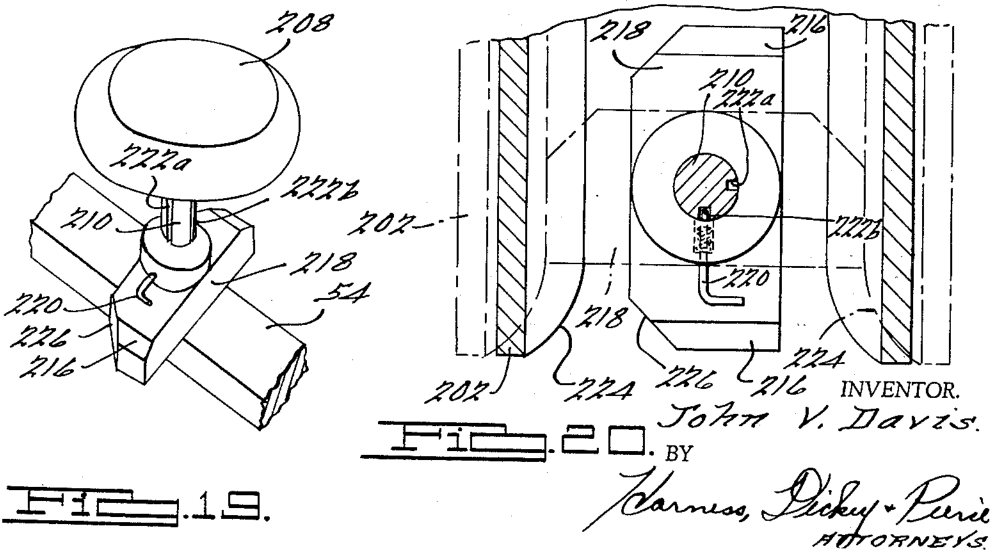
FIG. 19 is a fragmentary perspective view of an engaging head on a work carrier and a selector cam movably mounted thereon.
FIG. 20 is a horizontal transverse sectional view of the selector cam and engaging rail shown in FIG. 18 and taken along line 20—20 thereof.

The selector cam 218 as shown in FIGURE 19 is maintained in the operative or inoperative position by a resiliently biased engaging pin 220 having the end portion thereof projecting inwardly beyond the bore therethrough and adapted to alternatively engage splines **222*a*, 222*b* angularly disposed from each other at substantially 90° and extending longitudinally along the periphery of the splined shaft 210. Rotation of the selector cam 218 to and from the operative and inoperative position is simply achieved by withdrawing the projecting end portion of the engaging pin 220 in opposition to the resilient biasing force and out of engagement with either of the splines 222*a*, 222*b* and thereafter rotating the cam 90° until the projecting end portion of the engaging pin becomes aligned with and engages the other of the splines 222*a*, 222*b*. Positioning of the selector cam 218 in the appropriate position can be conveniently performed at the loading station of the conveying machine by the operator to achieve the selected treating sequence desired in accordance with the type of work pieces loaded on the work carrier. It will also be noted in FIGURE 20 that the ends of the camming flanges 212 are provided with an arcuate taper 224 and the forward side surfaces of the selector cam 219 are provided with a rearward taper 226 to facilitate smooth engagement of the selector cam when in the operative position and the camming flanges during the advancement of a workcarrier toward the input or load end portion of the engaging rail 200**.

To prevent the engaging rail 200 from releasing a work carrier which has been retained in the raised position on subsequent movement of the engaging rail to the expanded position by the next advancing work carrier having its selector cam in the operative position, the engaging rail 200 as shown in FIGURE 17 is comprised of two longitudinal sections **200*a*, 200*b* disposed in end abutting alignment and which are independently movable to and from the contracted position and the expanded position. The adjacent ends of the engaging rail sections 200*a*, 200*b* are disposed in substantially vertical alignment with the adjacent ends of the movable supporting rail sections 94** of the lift sections.

The auxiliary pusher mechanism of each of the lift sections as shown in FIGURE 17 is effective to transfer the work carriers from the load end portion to the unload end portion of the movable rail sections thereof. The principal pusher mechanism is effective to transfer a work carrier when in the lowered position from the unload end portion of the movable rail section 94 to the load end portion of the next adjacent movable supporting rail section. Since the principal pusher mechanism is only effective to transfer the work carriers from one movable supporting rail section to the next adjacent movable supporting rail section when the work carriers are in the lowered position, any work carriers which have been retained in the elevated position by the engaging rail section **200*a*, are transferred to the next adjacent engaging rail section 200*b* by a secondary pusher mechanism mounted longitudinally of the engaging rail and operative to advance the elevated work carriers from the output or unload end portion of the engaging rail section 200*a* to the input or load end portion of the engaging rail section 200*b* concurrently with the advancing movement of the principal pusher mechanism. As shown in FIGURES 17 and 18, the secondary transfer mechanism comprises a pair of sprockets 228 rotatably mounted at the load end portion of the engaging rail section 200*a* and at the unload end portion of the engaging rail section 200*b* around which a continuous transfer chain 230 is trained. The lower portion of the transfer chain 230 extends longitudinally between the side members 202 of the engaging rail and incorporates a pivotally mounted secondary pusher 232 thereon which is adapted to engage the engaging head 208** of a work carrier which has been retained in the raised position.

The oscillating movement of the transfer chain 230 is accomplished by a suitable fluid actuated power cylinder 234 which is mounted on the upper surface of the bight portion of the upright frames 196 longitudinally of the transfer chain 230. A piston rod 236 of the power cylinder 234 is connected to a clip 238 affixed to one of the links of the transfer chain 230 whereby the reciprocating movement of the piston rod 236 to and from a retracted position and an advanced position is effective to cause the transfer chain 230 and the secondary pusher 232 thereon to move to and from a retracted position and an advanced position. The reciprocation of the piston rod 236 of the power cylinder 234 of the secondary pusher mechanism is adapted to substantially coincide with reciprocating movement of the transfer cylinder 78 of the principal pusher mechanism. By this arrangement a work carrier engaged by the engaging rail section **200*a* is advanced therealong to a position on the load end portion of the adjacent engaging rail section 200*b* through a horizontal displacement substantially equal to the advancing movement which that workcarrier would have been advanced along the movable rail sections 94 above the single station treating receptacle 44*e* had that carrier not been retained in the raised position. The operation of the secondary pusher mechanism can be controlled by a suitable limit switch LS3 in addition to positive mechanical stops which restrict the reciprocating travel of the piston rod 236 or alternatively, the power cylinder can be controlled by the limit switch LS3 which on actuation is effective to regulate the flow of fluid to the closed end and rod end of the power cylinder 234. Tripping of the limit switch LS3 is achieved by actuators 240*a*, 240*b* adjustably mounted in longitudinally spaced positions on the transfer chain 230** and adapted to trip the limit switch LS3 when the fully advanced and fully retracted positions respectively are attained. The limit switch LS3 also serves to interlock the movement of the secondary transfer mechanism with the control circuit of the conveying machine to assure that the workcarrier which has been retained in the raised position has been advanced to the appropriate position along with the engaging rail before the next operating function of the machine commences.

In operation the overhead engaging rail provides for skip operation of selected work carriers whereby the work racks on the selected carriers are omitted from immersion in the treating solution contained in the treating receptacle **44*e*. As hereinabove stated, the selection of the workcarriers which are to undergo a skip operation is achieved by positioning the selector cam 218 thereon in the inoperative position whereby the engaging head 208** on that work carrier is engaged by the engaging rail 200. The work racks C1, C2, and C3 in the conveying machine shown in FIGURE 17, are in a position just prior to the next advancing movement of the principal pusher mechanism. The work carrier C2 as shown in solid lines has been retained in the raised position by the engaging rail section 200*a* and is undergoing a skip operation. On the advancing movement of the principal pusher mechanism the work racks C1 and C3 are moved from the positions shown in solid lines to the positions shown in phantom in FIGURE 17. Concurrently, the work rack C2 is advanced by the secondary pusher mechanism from the engaging rail section 200*a* to a position on the engaging rail section 200*b*. When the secondary pusher mechanism attains the fully advanced position, limit switch LS3 is tripped by the actuator 240*a* on the transfer chain 230 signaling the control circuit of the principal conveying machine that the secondary pusher mechanism has completed its operating function. Thereafter the movable rail sections 94 are moved to the raised position whereby the work rack C1 is withdrawn from the treating receptacle adjacent to the treating receptacle 44*e*. In addition, the work rack C2 in the position shown in phantom in FIGURE 17 becomes jointly supported in the raised position by the movable supporting rail section 94 and the overhead engaging rail section 200*b*. The auxiliary pusher mechanism of each of the lift sections are then operated to effect an advancement of the work racks C1 and C2 from the load end portion of the elevated movable supporting rail sections 94 to the unload end portions thereof. During the advancing movement of the work rack C1 along the movable supporting rail section 94 the engaging head 208 on the upper portion of the work carrier supporting that work rack is advanced into the engaging rail section 200*a* which alternately remains in the contracted position or is moved to the expanded position depending on the position of the selector cam 218 on the work carrier. The advancement of the work carrier C2 along the next adjacent elevated movable supporting rail section 92 causes the engaging head 208 of the work carrier from which it is suspended to be advanced beyond the unload end portion of the engaging rail section 200*b* and becomes solely supported by the movable supporting rail section 94. The movable supporting rail sections 94 of each of the lift sections are thereafter lowered whereby the work rack C2 is immersed at the first station of the next adjacent treating receptacle in the position formerly occupied by the work rack C3. The work rack C1 is alternately lowered in the treating receptacle 44*e* or is retained in the elevated position by the engaging rail section 200*a*, depending on the position of the selector cam 218 on that work carrier. Accordingly, by selectively positioning the selector cam 218 on each of the work carriers the work racks suspended therefrom will alternately be conveyed through the predetermined treating sequence of the conveying machine or will be selectively subjected to a skip operation at the treating receptacle 44*e*.

The foregoing operating sequence of the overhead engaging rail and secondary pusher mechanism is equally applicable to the operating relationship of the auxiliary pusher mechanisms of the lift sections and principal pusher mechanism as hereinbefore described in connection with FIGURES 1 to 3 and to the reverse direction operation hereinbefore described in connection with FIGURES 27 to 29. When the advancing movement of the auxiliary pusher mechanism occurs in unison with the advancing movement of the principal pusher mechanism, the treating receptacle 44*e* is a single station receptacle whereas when the reversal operation is employed, the treating receptacle 44*e* is a two-station treating receptacle.

Skip operation of selected work carriers can also be accomplished at relatively long multiple station treating receptacles such as the treating receptacle 44*f* shown in FIGURE 22 in a manner similar to that heretofore described in connection with the treating receptacle 44*e* of FIGURE 17. The engaging rail section 200*c* as shown in FIGURE 22 is disposed above the first station of the multiple station treating receptacles and the engaging rail section 200*d* is disposed above the last station of the multiple station treating receptacle. A fixed engaging rail section 242 is supported by the upright frames 196 and extends between and is disposed in substantial longitudinal alignment with the engaging rail sections 200*c*, 200*d*. The fixed engaging rail section 242 can vary in length depending on the number of stations of the multiple station treating receptacle. The overhead engaging rail shown in FIGURES 22 and 23 employs an alternate satisfactory secondary pusher mechanism in lieu of the continuous transfer chain 230 and sprockets 228 heretofore shown and described in connection with the overhead engaging rail above the treating receptacle 44*e* of FIGURE 17. The secondary pusher mechanism as may be best seen in FIGURE 23 comprises a reciprocable secondary pusher bar 244 of a T-shaped cross section extending longitudinally between the side members 202 and is slidably supported in a series of guide shoes 246 secured to the bight portion of the fixed engaging rail section 242. A series of secondary pushers 247 are pivotally connected to the depending web of the secondary pusher bar 244 and are adapted to engage the engaging head 208 on the workcarriers which have been retained in the raised position.

Reciprocation of the secondary pusher bar 244 to and from an advanced position and a retracted position is achieved by a secondary transfer cylinder 248 disposed longitudinally of the fixed engaging rail section 242. A side bracket 250 affixed to the depending web portion of the secondary pusher bar 244 extends transversely through a longitudinal slot 252 in the fixed engaging rail section 242 and is connected to a piston rod 254 of the secondary transfer cylinder 248. Reciprocation of the secondary pusher mechanism is effective to intermittently transfer a workcarrier which has been retained by the engaging rail section 200*c* from the unload end portion thereof, along the fixed engaging rail section 242 to a position on the load end portion of the engaging rail section 200*d*. The workcarrier is thereafter transferred beyond the engaging rail section 200*d* by the auxiliary pusher mechanism of the lift section as hereinbefore described. The advancing movement of the secondary pusher mechanism is substantially synchronized with the advancing movement of the principal pusher mechanism whereby the workcarriers which have been retained in the raised position are progressively advanced along the engaging rail sections through the same advancing increment as those carriers would have been advanced along the fixed supporting rail 68 had they not been retained in the raised position. The operating sequence of the overhead engaging rail above a multiple station treating receptacle as shown in FIGURE 22 is the same as that hereinbefore described in connection with the operating sequence of the skip operation as shown in FIGURE 17 whereby the work racks C1, C2 and C3 are selectively retained in the elevated position or lowered in accordance with the treating sequence of the principal conveying machine.

Figure 23:
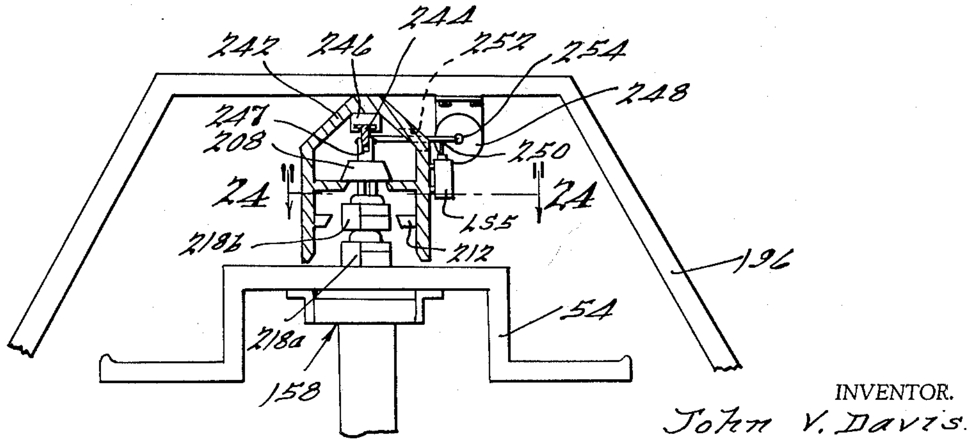
FIG. 23 is a fragmentary transverse sectional view taken along line 23—23 of FIG. 22 and showing the engaging head of a work carrier engaged by the overhead engaging rail and illustrating a work carrier having two selector cams incorporated thereon.

The actuating fluid for the secondary transfer cylinder 248 can be derived from the central fluid system of the conveying machine or alternately from an auxiliary fluid system provided for that purpose. The reciprocating travel of the secondary pusher bar 244 can be controlled by the stroke of the secondary transfer cylinder and signal limit switches LS4 and LS5 as shown in FIGURE 23 which are adapted to be tripped by the side bracket 250 when the fully advanced and fully retracted positions, respectively, are attained. The limit switches are preferably interlocked in the control circuit of the conveying machine to assure that the secondary pusher bar has attained the appropriate position before the next operating function of the machine commences. Alternatively, the signal limit switches LS4 and LS5 can also operate to control suitable solenoid actuated valves in the conduits supplying pressurized fluid to the secondary transfer cylinder 248 so as to initiate and stop movement of the secondary pusher bar.

Figures 24, 26:
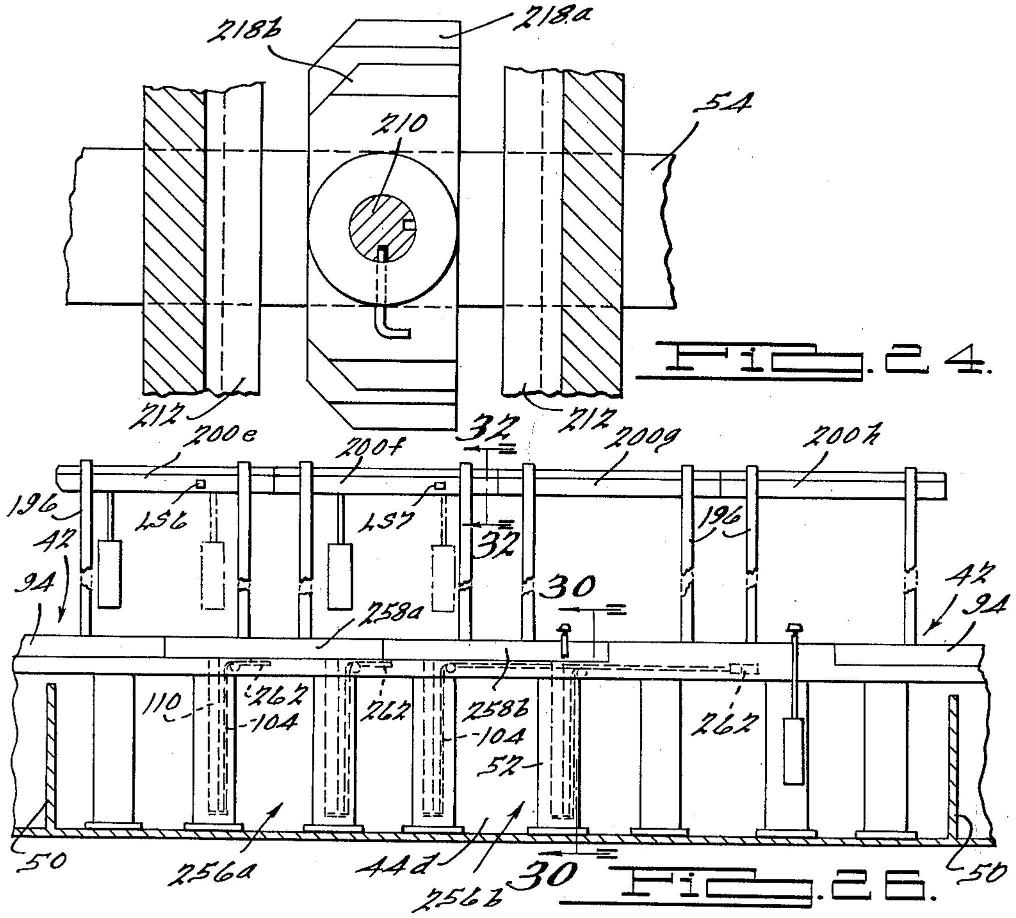
FIG. 24 is a horizontal sectional view of the selector cams on the work carrier shown in FIG. 23 and taken along line 24—24 thereof.
FIG. 26 is a schematic fragmentary side elevation view of a conveying machine incorporating thereon an overhead engaging rail providing selective treatment of the workpieces in the treating receptacles below.
Figure 25:
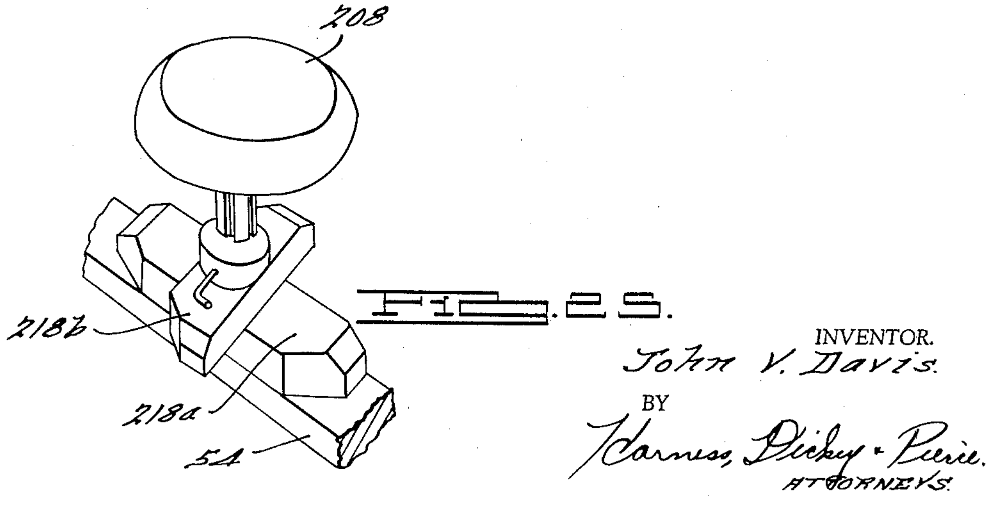
FIG. 25 is a fragmentary perspective view of an engaging head on a work carrier incorporating two selector cams thereon.

The workcarrier 54 shown in FIGURE 23 incorporates two selector cams 218*a*, 218*b* which provides for increased selectivity and processing flexibility of the workpieces as they are conveyed along the conveying machine. The use of two selector cams 218*a*, 218*b* is necessitated when selective skip operation is desired in conveying machines incorporating two overhead engaging rails over different treating receptacles. In such an arrangement the selector cam 218*a* would be effective to coact with the camming flanges 212*a* on one of the engaging rails while the selector cam 218*b* would be operative to coact with the camming flanges 212 on the second engaging rail. When both of the selector cams 218*a*, 218*b* are in the inoperative position as shown in FIGURE 24, the engaging head of that workcarrier is successively engaged by both of the engaging rail sections whereby the workpieces thereon are subjected to a skip operation at both treating receptacles. When one of the selector cams, such as selector cam 218*a* as shown in FIGURE 25, is positioned in the operative position the workcarrier is subjected to a skip operation at the treating receptacle having an engaging rail thereover which is adapted to be operated by the selector cam 218*b* and is not engaged by the other engaging rail section which is moved to the expanded position by the selector cam 218*a*. When both selector cams 218*a*, 218*b* are in the operative position the workcarrier is not engaged by either of the engaging rails and the workpieces thereon undergo the normal treating sequence of the conveying machine. Accordingly, by selectively positioning the selector cams 218*a*, 218*b*, the work racks can be selectively transferred through either of four treating sequences; namely, the conventional treating sequence of the conveying machine, skip operation at either one of the two receptacles provided with an overhead engaging rail, or skip operation of both of the receptacles. It will be appreciated by those skilled in the art that more than two selector cams can be employed on the workcarrier corresponding to the number of the overhead engaging rails employed to provide still further selectivity and processing versatility of the workpieces.

In addition to providing for selective skip operation of certain treating receptacles, the overhead engaging rail can also be utilized to provide selective delayed-dip or early pick-up operation which still further increases the processing versatility and flexibility of the conveying machine. In a delayed-dip operating sequence, the lowering of the workcarrier into a multiple station treating receptacle is delayed until the second, third or fourth station, for example, whereby the total duration of the treating time of the work racks in the multiple station treating receptacle is shortened in accordance with the desired treatment. Similarly, an early pick-up operation enables a reduced treatment time of selected work racks in a multiple station treating receptacle by raising the work racks out of the treating receptacle one, two or more stations before the last station of the multiple station treating receptacle. Accordingly, the net result of both the delayed-dip and early pick-up operation is to reduce the duration of treating time in the multiple station treating receptacle from that of the predetermined sequence of the conveying machine. Inasmuch as the treating function of the delayed-dip and early pick-up operation is identical and inasmuch as the structure required to achieve this selective operation is essentially the same in both installations, only the delay-dip operation has been specifically illustrated in the drawings and described in detail in the specification. Deviations between the delay-dip and early pick-up operation will subsequently be set forth in a later portion of this specification.

A typical installation of a delayed dip structure providing for selective delayed-dip and skip operation of a four-station multiple station treating receptacle 44*d* is shown in FIG. 26. In accordance with the installation shown, each of the work racks can be selectively subjected to the conventional treating sequence of the conveying machine wherein the work rack is immersed at the first station of the multiple station treating receptacle 44*d* and advanced therethrough in the lowered position whereby the work pieces are subjected to the maximum treating time in the treating solutions contained therein. Alternatively, each of the work racks can be selectively subjected to a skip operation wherein the work rack is engaged by the overhead engaging rail and intermittently advanced therealong over the multiple station treating receptacle 44*d* completely omitting immersion in the treating solution contained in the treating receptacle. In the specific embodiment shown, delayed-dip operation of selective work carriers is also achieved whereby the carriers can be selectively lowered into the multiple station treating receptacle 44*d* either at the second station or at the third station thereof whereby the total treating time of the work rack in the solution contained therein is shortened in accordance with the specific treatment desired.

The structure and controls necessary to provide for selective skip and delayed-dip operation at the multiple station treating receptacle 44*d* is shown in FIG. 26 and FIGS. 30 to 32. The entrance and exit stations of the multiple station treating receptacle 44*d* are provided with conveyor lift sections 42 of the type hereinbefore described having movable supporting rail sections 94 extending above the transverse partitions 50 separating the multiple station treating receptacle 44*d* from the adjoining treating receptacles. An aligned series of engaging rail sections 200*e* to 200*h* of the same type as hereinbefore described extend above the multiple station treating receptacle 44*d* and are supported o nthe upright frames 196. Each of the workcarriers 54 are provided with three selector cams 218*c*, 218*d* and 218*e* which when moved to the operative position are adapted to actuate and move the engaging rail sections 200*e*, 200*f* and 200*g*, respectively from the contracted to the expanded position. When all of the selector cams are in the inoperative position the workcarrier is retained in the raised position and undergoes a skip operation above the multiple station treating receptacle 44*d*. Advancement of the workcarriers along the overhead engaging rail is achieved by a secondary pusher mechanism including a secondary pusher bar 244 slidably mounted in guide shoes 246 and reciprocable by a secondary transfer cylinder as hereinbefore shown and described in connection with FIGS. 22 and 23. When the selector cam 218*c* is disposed in the operative position the first engaging rail section 200*e* is cammed to the expanded position on advancement of a workcarrier along the movable rail section 94 preventing engagement of the engaging head 208 thereon by the engaging flanges 206 of the engaging rail section 200*e* and allowing the carrier to be lowered into the first station of the multiple station treating receptacle 44*d* when the movable rail section 94 descends from the raised position. Selective delayed-dip operation is achieved by positioning the selector cam 218*c* in the inoperative position whereby the workcarrier is retained in an elevated position at the first station of the multiple station treating receptacle and positioning either selector cams 218*d* or 218*e* in the operative position depending on whether the work carrier is to be lowered at the second or the third station of the treating receptacle. With the selector cam 218*c* in the inoperative position and the selector cam 218*d* in the operative position the workcarrier is lowered at the second station of the multiple station treating receptacle. With both the selector cams 218*c* and 218*d* in the inoperative positions and with the selector cam 218*e* in the operative position, the workcarrier undergoes a delayed-dip operation and is lowered at the third station of the multiple station treating receptacle.

When the selector cam 218*c* is in the inoperative position and the selector cam 218*d* is in the operative position, the engaging head 208 on the workcarrier is engaged by the engaging rail section 200*e* and is retained in the elevated position above the first station of the multiple station treating receptacle. When the workcarrier is advanced along the overhead engaging rail by the secondary pusher mechanism the coaction between the selector cam 218*d* and the engaging flanges on the engaging rail section 200*f* cause the side members thereof to move to the expanded position during the advancing movement of the workcarrier thereby disengaging the engaging head 208 and enabling the workcarrier to be lowered at the second station of the multiple treating receptacle. In a similar manner the selector cam 218*e* when in the operative position is effective on advancement of the work carrier into the engaging rail section 218*g* to move the side members thereof to the expanded position disengaging the engaging head 208 from the engaging flanges and enabling the workcarrier to be lowered at the third station of the multiple treating receptacle.

To prevent the uncontrolled fall of a workcarrier undergoing a delayed-dip operation upon being released from the overhead engaging rail sections 200*f* or 200*g*, a pair of auxiliary lift sections 256*a*, 256*b* are incorporated at the second and third treating stations, respectively, of the multiple station treating receptacle. The auxiliary lift sections 256*a*, 256*b* are of a standardized construction similar to the lift sections 42 and include auxiliary movable supporting rail sections 258*a*, 258*b*, respectively, which are movable to and from a raised position and a lowered position in a manner similar to the movable rail sections 94 of the lift sections 42. The raising and lowering of the auxiliary movable supporting rail sections 258*a*, 258*b* is accomplished in a manner similar to that of the lift sections 42 and includes the lift chains 104 connected to the slide tubes 110 which extend downwardly into the stanchions 52. Energization of the lift chain 104 is accomplished by the lift bar 102 having a horizontal flange 260 affixed to the upstanding web thereof as can be best seen in FIG. 30 and on which flange an engaging shoe 262 is slidably mounted.

One end of the lift chain 104 is connected to a bracket 264 extending from and affixed to the engaging shoe 262. The lift chain is trained over a sprocket 106 and extends downwardly into the stanchion 52 and is connected to the lower end portion of the slide tube 110 in a manner similar to that hereinbefore described in connection with the lift section 42.

The engaging shoe 262 is selectively connectable to the lift bar 102 by a suitable latch such as, for example, a solenoid 266 mounted on the engaging shoe and having the plunger 268 projecting through the engaging shoe and adapted to engage a suitable aperture in the horizontal flange 260 on the lift bar 102. When in the disengaged condition, the engaging shoe 262 remains stationary with respect to the conveying machine and slides on the lift bar 102 during its reciprocating movement. Any frictional coaction between the horizontal flange 260 and the engaging shoe 262 which tends to move the engaging shoe forward during the advancing movement of the lift bar 102 is restrained by the lift chains 104 connected to the engaging shoe. To prevent the engaging shoe 262 from moving rearwardly during the retracting movement of the lift bar 102 when in the disengaged condition a suitable stop 270 is provided as shown in FIG. 30 which coacts with and restricts the rearward movement of the engaging shoe and further assures appropriate alignment between the plunger 268 and the aperture in the horizontal flange 260 when the lift bar attains the fully retracted position.

Figure 30:
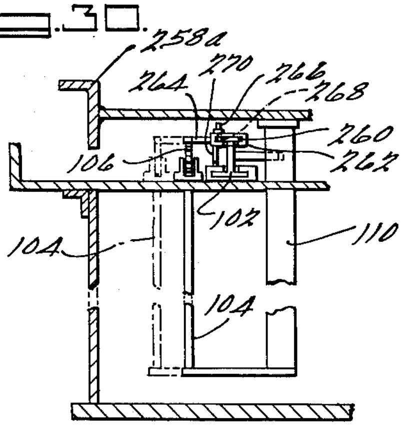
FIG. 30 is a fragmentary transverse vertical sectional view illustrating the mechanism for raising and lowering the auxiliary lift section of the conveying machine shown in FIG. 26 and taken along line 30—30 thereof.
Figures 31, 32:
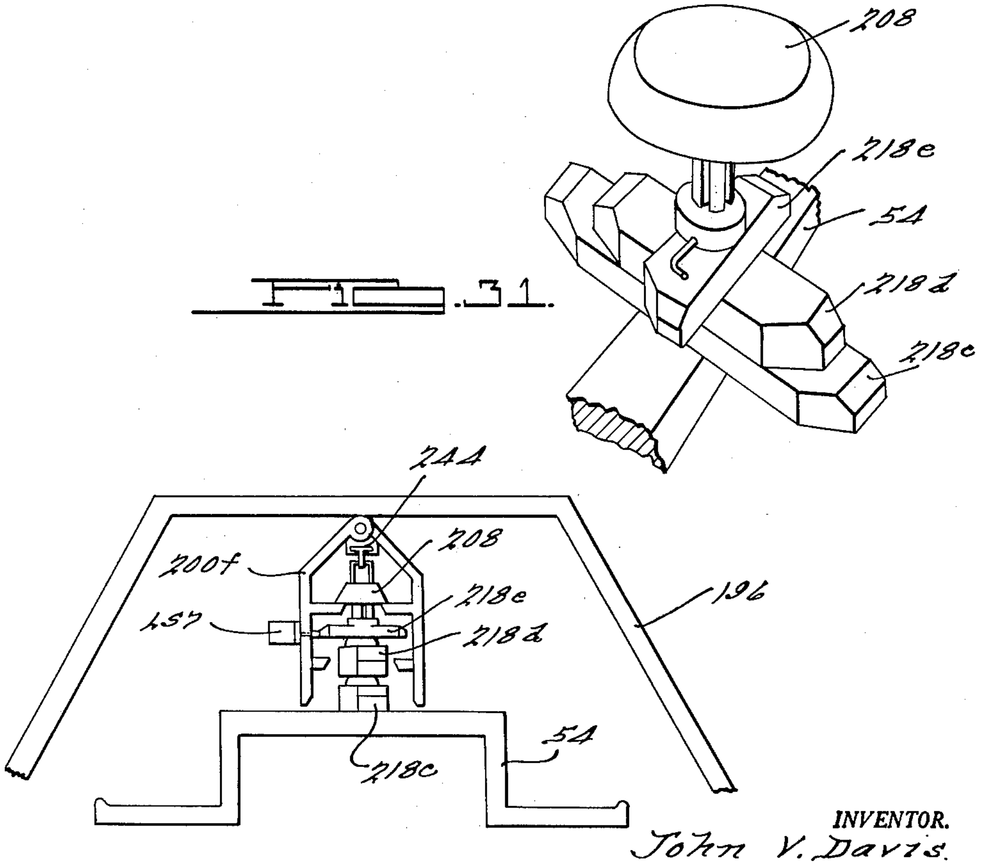
FIG. 31 is a fragmentary perspective view of an engaging head on a work carrier having three selector cams thereon.
FIG. 32 is a transverse vertical sectional view through the engaging rail section of the machine shown in FIG. 26 and taken along the line 32—32 thereof.

To avoid interference between the engaging shoes 262 of the auxiliary lift sections 256*a* and 256*b*, the engaging shoes are longitudinally separated as shown in FIG. 26 a distance sufficient to avoid a conflict and moreover the lift chains 104 are laterally offset from each other as shown in FIG. 30 to prevent interference during the actuation of either the auxiliary lift section 256*a* or 256*b*.

Actuation of the solenoid 266 on the engaging shoes 262 which lift the auxiliary movable supporting rail section 258*a* of the auxiliary lift section 256*a* is accomplished in response to actuation of a limit switch LS6 mounted on the side member 202 of the engaging rail section 200*e* and which is adapted to be tripped by the selector cams 218*d* when disposed in the operative position. Similarly, energization of the solenoids 266 on the engaging shoes 262 connected to the auxiliary lift section 256*b* is achieved in response to the actuation of a control limit switch LS7 mounted on the side member of the engaging rail section 200*f* and adapted to be tripped by the selector cam 218*e* when in the operative position as may be best seen in FIG. 32. The tripping of either the control limit switches LS6 or LS7 signals the control circuit of the conveying machine and energizes suitable latch relays which are latched in the closed position thereby supplying current to either or to the solenoids 266 which connect the appropriate engaging shoes 262 to the lift bar 102 for the next advancing and retracting cycle of the lift bar and which latch relay is disengaged or unlatched on the completion of the retracting movement of the lift bar 102 as signalled by the tripping of the lift control limit switch LS2. By this arrangement, the auxiliary movable supporting rail sections 258*a*, 258*b* are selectively moved to the elevated position concurrently with the movable rail sections 94 of the lift sections 42 to receive and support a workcarrier undergoing a delayed-dip operating sequence and to thereafter lower that workcarrier at either the second or third treating station of the multiple station treating receptacle 44*d*.

Figure 33:
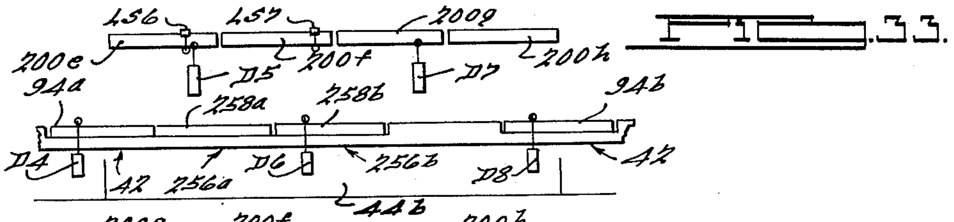
FIGS. 33 through 39 are schematic fragmentary side elevation views illustrating a typical automatic skip and delayed dip operation of selected work carriers over a multiple station treating receptacle.
Figure 34:
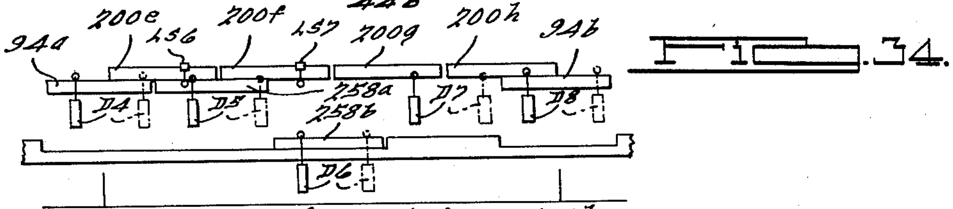

The extreme versatility and processing flexibility provided by the selective skip and delayed-dip operating sequence hereinabove described will be further appreciated and understood by examining a typical operating sequence as diagrammatically shown in FIGS. 33 to 39. The machine is shown in FIG. 33 at the completion of the advancing movement of the principal pusher mechanism and the secondary pusher mechanism just prior to the elevating movement of the movable rail sections 94*a*, 94*b* of the lift sections 42. The workcarrier and racks D4 are scheduled for a delayed-dip operation at the third station of the multiple station treating receptacle 44*d*. The workcarrier and work rack D5 is scheduled for a delayed-dip operation at the second station of the multiple station treating receptacle. The workcarriers and work racks D6 and D8 are undergoing the conventional treating sequence of the conveying machine while the workcarrier and work rack D7 is undergoing a skip operation of the multiple station treating receptacle. During the preceding advancing movement of the workcarrier D5 the selector cam 218*d* thereon tripped the control limit switch LS6 which in turn has connected the engaging shoes to the lift bar controlling the auxiliary movable rail section 258*a*. Thereafter, the lift cylinder is energized whereby the movable rail sections 94*a*, 94*b* and the auxiliary movable rail section 258*a* are moved from the lowered position as shown in FIG. 33 to the raised position as shown in FIG. 34 and during which movement the workcarriers D4 and D8 are moved to the raised position. The principal pusher mechanism of the conveying machine, the auxiliary pusher mechanisms of the lift sections, and the secondary pusher mechanism of the overhead engaging rail is then moved from the retracted to the advanced position whereby each of the work racks are advanced from the position shown in solid lines in FIG. 34 to the position shown in phantom. On the advancing movement the workcarrier D5 is transferred from the engaging rail section 200*e* to a position on the engaging rail section 200*f* which latter section is moved to the expanded position releasing the engaging head of the workcarrier through the coaction of the selector cam 218*d*. Accordingly, the workcarrier D5 as shown in phantom in FIG. 34 is supported in the elevated position above the second treating station of the multiple station treating receptacle by the auxiliary movable rail section 258*a*.

Figure 35:
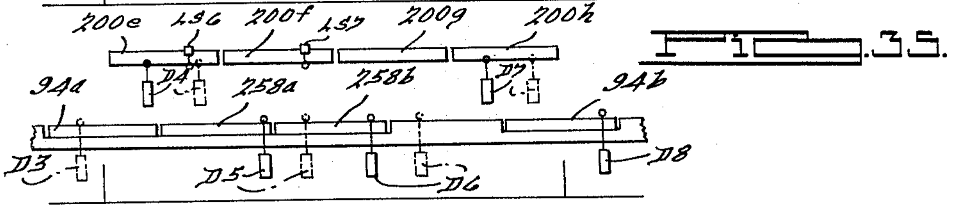
Figure 36:
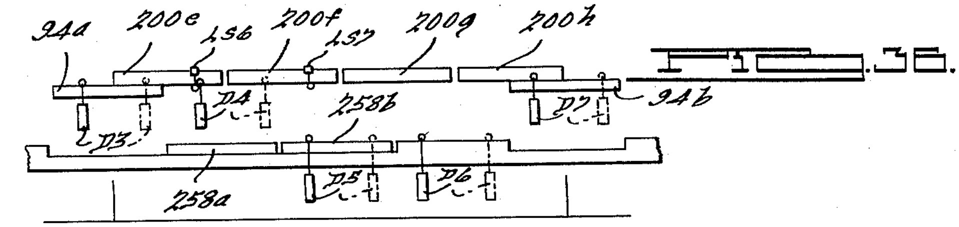

At the completion of the advancing movement of the several pusher mechanisms the lift bar is actuated and commences its retracting movement whereby the movable rail sections 94*a*, 94*b* and the auxiliary movable rail section 258*a* are lowered from the raised position shown in FIG. 34 to the lowered position shown in FIG. 35. When the lift bar attains the fully retracted position a suitable down-dwell timer is energized which commences to time a predetermined down-dwell period in accordance with the processing duration desired. At the completion of the down-dwell period the principal pusher mechanism and secondary pusher mechanisms are actuated whereby the workcarriers are advanced from the positions shown in solid lines in FIG. 35 to the positions shown in phantom. At the completion of the advancing movement of the pusher mechanisms, the lift bar is actuated whereby the movable rail sections 94*a*, 94*b* are moved from the lowered position as shown in FIG. 35 to the raised position as shown in FIG. 36. During the elevating movement of the movable rail sections 94*a*, 94*b*, a workcarrier D3 which is to undergo a conventional treating sequence in the multiple station treating receptacle is raised from the last station of the preceding receptacle in order that it can be transferred above the intervening partition. Similarly, the workcarrier D7 which has completed a skip operation above the multiple station treating receptacle is now jointly supported by the engaging rail section 200*g* and the movable rail section 94*b*. At the completion of the advancing movement of the lift bar, the principal, auxiliary, and secondary pusher mechanisms are actuated whereby the workcarriers are advanced from the positions shown in solid lines in FIG. 36 to the positions shown in phantom. During the advancing movement the workcarrier D4 which is scheduled to undergo a delayed-dip operation at the third station of the multiple station treating receptacle remains in engagement with the overhead engaging rail and is transferred to a position on the load end portion of the engaging rail section 200*f*.

Figure 37:
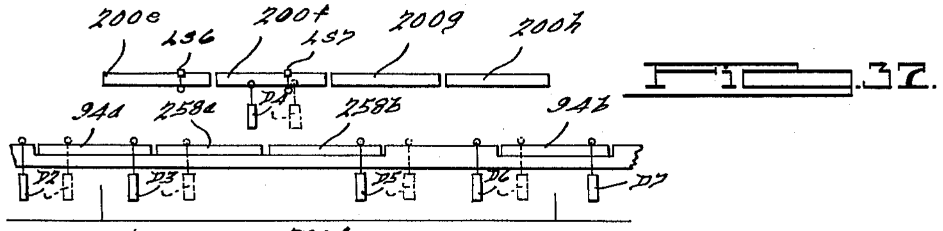

At the completion of the advancing movement of the several pusher mechanisms the lift bar commences its retracting movement whereby the workcarrier D3 is lowered at the first station of the multiple station treating receptacle and the workcarrier D7 is lowered at the first station of the next adjoining treating receptacle as shown in FIG. 37. At the completion of the retracting movement of the lift bar the down-dwell timer is again energized and commences to time a predetermined down-dwell period. At the expiration of the down-dwell period the principal and secondary pusher mechanisms are actuated whereby the workcarriers are advanced from the positions shown in solid lines in FIG. 37 to the positions shown in phantom. During the advancing movement of the pusher mechanisms, the work rack D4 is advanced from the position at the load end portion of the engaging rail section 200*f* to the unload end portion thereof the selector cam 200*e* thereon which is positioned in the operative position trips limit switch LS7. Actuation of limit switch LS7 causes the solenoid 266 to energize connecting the engaging shoes of the auxiliary lift section 256*b* to the lift bar.

Figure 38:
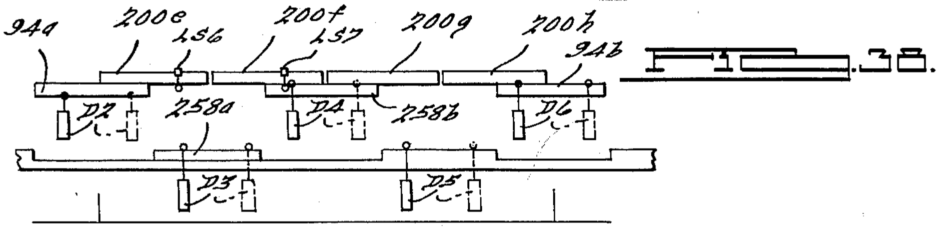

At the completion of the advancing movement of the principal and secondary pusher mechanism the lift bar commences its advancing movement whereby the movable rail sections 94*a*, 94*b* and the auxiliary movable rail section 258*b* are moved from the lowered position as shown in FIG. 37 to the raised position as shown in FIG. 38. During the elevating movement a workcarrier D2 is raised from the last station of the preceding treating receptacle in order that it can be transferred above the intervening partition. Additionally, the workcarrier D6 which has completed a conventional treating sequence in the multiple station treating receptacle is raised in order that it can be transferred to a position above the first station of the next adjoining treating receptacle. Elevation of the auxiliary rail section 258*b* jointly supports the workcarrier D4 which is engaged by the engaging rail section 200*f*. At the completion of the advancing movement of the lift bar the principal, auxiliary, and secondary pusher mechanisms are actuated whereby the work carriers are advanced from the positions shown in solid lines in FIG. 38 to the positions shown in phantom. During the advancing movement the workcarrier D4 is advanced off the engaging rail section 200*f* and against the load end portion of the engaging rail section 200*g*. Further advancement of the workcarrier D4 causes the selector cam 218*e* thereon which is disposed in the operative position to move the engaging rail section 200*g* to the expanded position whereby the workcarrier becomes solely supported by the auxiliary movable rail section 258*b*.

Figure 39:
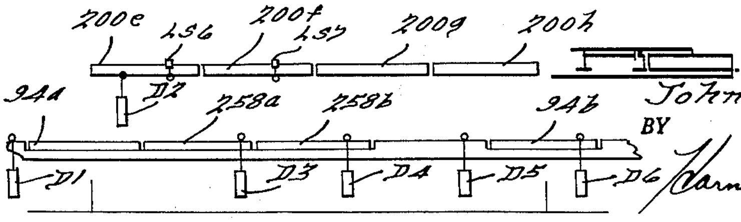

At the completion of the advancing movement of the several pusher mechanisms the lift bar commences its retracting movement whereby the movable rail sections 94*a*, 94*b* and the auxiliary rail section 258*b* are moved from the raised position as shown in FIG. 38 to the lowered position as shown in FIG. 39. During the descending movement of the auxiliary rail section 258*b* the workcarrier D4 positioned thereon is lowered in accordance with the delayed-dip treating sequence at the third station of the multiple station treating receptacle. The workcarrier D2 having all its selector cams in the inoperative position is retained in an elevated position by the engaging rail section 200*e* and commences a skip operation above the multiple station treating receptacle.

In accordance with the foregoing operating sequence successive workcarriers can be selectively subjected to the entire duration treating time in the multiple station receptacle, three-quarters or one-half of the total treating duration, or completely skip treatment in the multiple station treating receptacle depending upon the positions of the selector cams on each of the workcarriers. It will be appreciated by those skilled in the art that the number of auxiliary movable rail sections provided at a multiple station treating receptacle can be varied depending upon the size of the treating receptacle and enabling delayed-dip operation at any station of the multiple station treating receptacle.

With minor modifications, the foregoing overhead engaging rail can be employed to provide an early pick-up operation in lieu of the delayed-dip cycle hereinbefore described wherein selected workcarriers are raised at one or more stations preceding the last station of the multiple station treating receptacle and are engaged and suspended from the overhead engaging rail for the remaining duration of their travel above the multiple station treating receptacle. Auxiliary lift sections similar to those heretofore described are employed which are selectively operable by an actuating device on the carrier such as the selector cams, by a lever on the machine, or remotely by a control device programming a predetermined treating schedule for each of the workcarriers. Engagement of the engaging head on the workcarrier by the engaging rail section above during the elevating movement of the auxiliary movable rail section is accomplished by the coaction between the conical configuration of the engaging head 208 (FIG. 31) with the engaging flanges of the engaging rail section which are cammed outwardly thereby to the expanded position enabling entry of the engaging head. After the engaging head has passed upwardly beyond the engaging flanges the engaging rail section is resiliently biased toward the contracted position whereby the engaging flanges move inwardly in underlying supporting relationship to the engaging head maintaining the workcarrier in the raised position above the multiple station treating receptacle. The workcarrier so engaged is thereafter advanced along the engaging rail until it is disposed on the movable rail section of the lift section.

The sectionalized conveying machine herein shown and described which may include one or more engaging rail sections is applicable to but not limited to machines of the so-called straight-through type. Conveying machines of the straight-through type are characterized by having an elongated frame at one end of which the workcarriers are loaded and after being advanced therealong are unloaded at the opposite end thereof. The advantages and flexibility of the sectionalized conveying machine herein shown and described can also be incorporated in machines of the so-called turnaround-type which usually include two straight side sections connected at one or both of their ends by arcuate turnaround sections. Conveying machines of the turnaround-type have the further advantage of providing for a shorter length of the machine for a given length of treating sequence and generally enable a more compact installation enabling more efficient use of available plant space.

Figures 40, 41, 42:
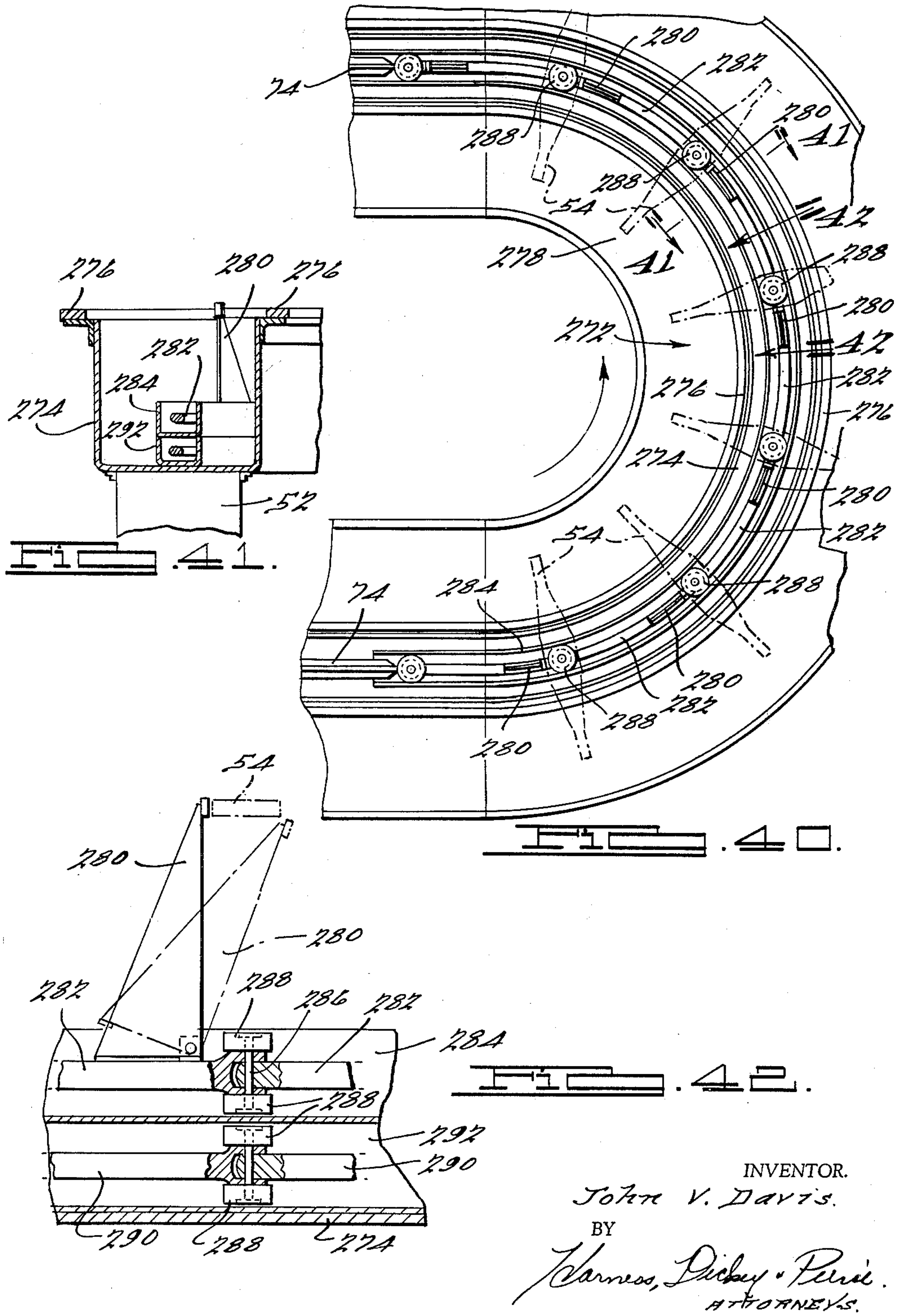
FIG. 40 is a fragmentary plan view of an arcuate turn-around section of the conveying machine.
FIG. 41 is a fragmentary transverse vertical sectional view through the turn-around section shown in FIG. 40 and taken along the line 41—41 thereof.
FIG. 42 is a fragmentary longitudinal vertical sectional view through the articulated connecting links of the arcuate turn-around section shown in FIG. 40 and taken along the line 42—42 thereof.

An arcuate turnaround section of standard construction which is adapted to be connected to and integrated with the sectionalized conveying machine thereby forming a conveying machine of the turnaround-type is shown in FIGS. 40 to 42. A turnaround section indicated at 272 in FIG. 40 is comprised of a U-shaped channel member 274 having a semicircular configuration and adapted to correspond with and connect to the channel members 58 of the fixed conveyor sections 40 and lift conveyor sections 42 thereby forming a continuous supporting rail. An arcuate supporting rail section 276 is affixed to each of the upper and outer edges of the U-shaped channel member on which the workcarriers 54 are slidably mounted. The channel member 274 is supported on a series of arcuately spaced stanchions 52 of the same type as those employed for supporting the fixed conveyor sections and lift conveyor sections. The stanchions 52 extend downwardly and are supported by the base of an arcuate turnaround receptacle 278 in which the work racks are immersed during the travel of the workcarriers along the turnaround section 272.

The workcarriers 54 are intermittently advanced around the turnaround section 272 by a series of pushers 280 which are pivotally connected to a plurality of articulated connecting links 282 as shown in FIGURE 42. The articulated connecting links 282 are supported in and guided by a U-shaped channel guide 284 of a semicircular configuration which extends along substantially the center of the U-shaped channel member 274. The articulated connecting links 282 are pivotally connected at their ends in a fork-type connection as shown in FIGURE 42 which incorporates a pivot pin 286 on the ends of which a pair of guide rollers 288 are rotatably mounted. The guide rollers 288 rotatably contact the inner surfaces of the upstanding legs of the U-shaped channel guide 284 and serve to centrally position the articulated connecting links in the channel guide. The ends of the connecting links 282 at each end of the turnaround section 272 are pivotally connected to the ends of the pusher bars 74 in a manner as shown in FIGURE 40. Accordingly, reciprocation of the pusher bar 74 by the transfer cylinder causes the articulated connecting links 282 to undergo an oscillating movement and which movement is transferred to the pusher bar 74 along the opposite side of the conveying machine. When the articulated connecting links 282 are retracted from the advanced position the pushers 280 thereon pivot to an inoperative position as shown in phantom in FIGURE 42 in order to pass beneath and behind a workcarrier 54.

The reciprocating movement of the lift bars 102 along the straight sides sections of the conveying machine is transferred around the turnaround section 272 in a manner similar to that hereinabove described in connection with the pusher bars by employing a series of articulated lift links 290 which are disposed directly below the articulated connecting links 282 and are similar guided in a channel guide 292 of a semicircular configuration which extends along substantially the center of the channel member 274. The articulated lift links 290 are connected by fork-type joints similar to the articulated connecting links 282 and employ guide rollers 288 thereon to provide central guidance of the articulated lift links in the channel guide 292.

In the specific turnaround section shown in the drawings, the arcuate supporting rails 276 are fixed whereby the workcarriers 54 remain in the lowered position during their entire travel thereabout. It will be appreciated by those skilled in the art that the turnaround sections can be provided with lift sections having arcuate movable rail sections in accordance with the basic construction as shown and described in connection with the lift conveyor sections 42 to enable the workcarriers 54 to be elevated in order that they can be transferred over transverse partitions in the arcuate turnaround receptacle 278. In addition, the angularity of the arcuate turnaround section can be varied from the 180° section shown in FIG. 40 to any desired angularity to provide the desired layout.

Figure 43:
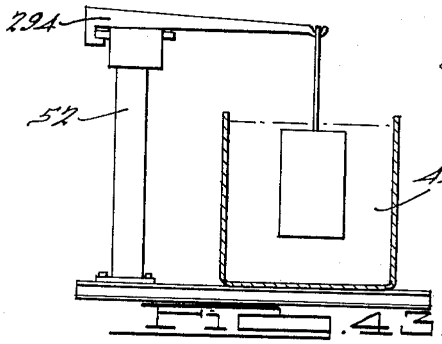
FIG. 43 is a schematic transverse elevation view of an alternate modification of a straight-through type conveying machine.

In the specific straight-through type and turnaround type conveying machines hereinbefore shown and described, the stanchions 52 are disposed in the treating receptacles and the workcarrier is transversely disposed on the supporting rails having a suitable work rack suspended from each of the ends thereof. It is also contemplated within the scope of the present invention that the sectionalized conveying machine can be arranged so as to produce a single row straight-through type conveying machine as shown in FIG. 43 incorporating a cantilever type workcarrier 294 thereon having one end portion thereof disposed above an aligned series of treating receptacles 44 from which a suitable work rack is suspended. In the specific arrangement shown in FIG. 43 the base of the stanchions 52 is rigidly affixed to a suitable base framework on which the treating receptacles 44 are positioned. The cantilever workcarrier 294 is raised and lowered by lift conveyor sections of the same type hereinbefore described.

Figure 44:
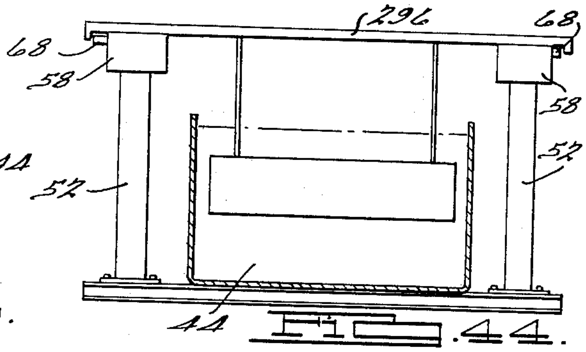
FIG. 44 is a schematic transverse elevation view of still another alternate modification of a straight-through type conveying machine.

Still another alternate satisfactory arrangement of the standardized sections of the sectionalized conveying machine is shown in FIG. 44 wherein a pair of upper frames are disposed in substantially parallel spaced relationship along each side of a treating receptacle 44 and between which supporting rails a workcarrier 296 extends and is movably mounted thereon. The specific arrangement as shown in FIG. 44 is particularly applicable for processing work racks or workpieces which are of a comparatively long length and cannot be conveniently handled in conventional treating receptacles. A principal pusher mechanism similar to that hereinbefore described is incorporated in each of the channel members 58 which operate in unison to intermittently and uniformly advance the workcarrier 296 along the supporting rail 68.

In accordance with the flexibility provided by the various standardized conveyor sections herein shown and described a conveying machine can readily be constructed by assembling the fixed conveyor sections, the lift conveyor sections, a power conveyor section, and the arcuate turnaround conveyor sections in any desired arrangement to produce a conveying machine having a prescribed treating sequence. In addition, by incorporating one or more auxiliary lift sections in conjunction with one or more overhead engaging rails comprising the fixed and movable engaging rail sections, selective skip, delayed-dip, and early pick-up operation can be provided at one or more treating stations in accordance with the position of the selector cams on each of the workcarriers thereby further increasing the flexibility and processing versatility of the sectionalized conveying machines.

While it will be apparent that the preferred embodiments herein illustrated as well calculated to fulfill the objects above stated, it will be appreciated that the invention is susceptible to modification, variation and change without departing from the proper scope or fair meaning of the subjoined claims.

What is claimed is:

1. In a conveying machine for conveying workpieces through a series of treating stations, the combination comprising an elongated frame extending along the treating stations, track means on said frame for supporting a work carrier movably mounted thereon, a section of said track means movable to and from a lowered position in alignment with said track means and a raised position above said track means for raising and lowering a work carrier thereon, lift means for moving said section to and from said lowered position and said raised position, a first pusher means disposed below said track means for advancing the work carrier along said track means, and a second pusher means on said section below said track means thereon for advancing the work carrier along said section when in said raised position.

2. In a conveying machine for conveying workpieces through a series of treating stations, the combination comprising an elongated frame extending along the treating stations, track means on said frame for supporting a work carrier movably mounted thereon, a section of said track means movable to and from a lowered position in alignment with said track means and a raised position above said track means for raising and lowering a work carrier thereon, lift means for moving said section to and from said lowered position and said raised position, a first reciprocable pusher means disposed below said track means for intermittently advancing the work carrier along said track means, and a second reciprocable pusher means on said section below said track means thereon and operatively connected to said first pusher means for advancing the work carrier along said section when in said raised position.

3. In a conveying machine for conveying workpieces through a series of treating stations, the combination comprising an elongated frame extending along the treating stations, track means on said frame for supporting a work carrier movably mounted thereon, a section of said track means movable to and from a lowered position in alignment with said track means and a raised position above said track means for raising and lowering a work carrier thereon, lift means for moving said section to and from said lowered position and said raised position, a first reciprocable pusher means disposed below said track means for intermittently advancing the work carrier along said track means, a second reciprocable pusher means on said section below said track means thereon for advancing the work carrier along said section when in said raised position, means for reciprocating said first pusher means to and from a retracted position and an advanced position, and cooperating means for drivingly connecting said first and said second pusher means and for synchronizing the retracting and advancing movements thereof.

4. In a conveying machine for conveying workpieces through a series of treating stations, the combination comprising an elongated frame extending along the treating stations, track means on said frame for supporting a work carrier movably mounted thereon, a section of said track means movable to and from a lowered position in alignment with said track means and a raised position above said track means for raising and lowering a work carrier thereon, lift means for moving said section to and from said lowered position and said raised position, a first reciprocable pusher means disposed below said track means for intermittently advancing the work carrier along said track means, a second reciprocable pusher means on said section below said track means thereon for advancing the work carrier along said section when in said raised position, means for reciprocating said first pusher means to and from a retracted position and an advanced position, and cooperating means for drivingly connecting said first and said second pusher means and for reversing the relative direction of reciprocable movement of said first and said second pusher means.

5. In a conveying machine for conveying workpieces through a series of treating stations, the combination comprising an elongated frame extending along the treating stations, track means on said frame for supporting a work carrier movably mounted thereon, a section of said track means movable to and from a lowered position in alignment with said track means and a raised position above said track means for raising and lowering a work carrier thereon, lift means for moving said section to and from said lowered position and said raised position, a first reciprocable pusher means disposed below said track means for intermittently advancing the work carrier along said track means, and a second reciprocable pusher means on said section below said track means thereon and operatively connected to said first pusher means for advancing the work carrier along said section when in said raised position, said first pusher means comprising a pusher bar slidably mounted on said frame below and longitudinally of said track means and reciprocable to and from a retracted position and an advanced position, a series of pushers pivotally mounted at spaced intervals on said pusher bar and adapted to engage and advance a work carrier during the advancing movement of said pusher bar, and means for reciprocating said busher bar.

6. In a conveying machine for conveying workpieces through a series of treating stations, the combination comprising an elongated frame extending along the treating stations, track means on said frame for supporting a work carrier movably mounted thereon, a section of said track means movable to and from a lowered position in alignment with said track means and a raised position above said track means for raising and lowering a work carrier thereon, lift means for moving said section to and from said lowered position and said raised position, a first reciprocable pusher means disposed below said track means for intermittently advancing the work carrier along said track means, and a second reciprocable pusher means on said section below said track means thereon and operatively connected to said first pusher means for advancing the work carrier along said section when in said raised position, said first pusher means comprising a pusher bar slidably mounted on said frame below and longitudinally of said track means and reciprocable to and from an advanced position and a retracted position, a series of upright pushers pivotally mounted at longitudinally spaced intervals on said pusher bar and pivotable to and from an operative position and an inoperative position, means on said pushers for maintaining said pushers in said operative position during the advancing movement of said pusher bar whereby a work carrier engaged thereby is advanced along said track means, said pushers pivotable to said inoperative position on contact with a work carrier during the retracting movement of said pusher bar, and means for reciprocating said pusher bar.

7. In a conveying machine for conveying workpieces through a series of treating stations, the combination comprising an elongated frame extending along the treating stations, track means on said frame for supporting a work carrier movably mounted thereon, a section of said track means movable to and from a lowered position in alignment with said track means and a raised position above said track means for raising and lowering a work carrier thereon, lift means for moving said section to and from said lowered position and said raised position, a first pusher means including a series of pushers mounted on a reciprocable pusher bar slidably disposed on said frame below and longitudinally of said track means and reciprocable to and from a retracted position and an advanced position for advancing a work carrier along said track means, a second pusher means for advancing a work carrier along said section when in said raised position, said second pusher means comprising a flexible member movably mounted below and longitudinally of said section, engaging means on said flexible member for engaging and advancing a work carrier on said section when in said raised position, and cooperating means for drivingly connecting said pusher bar to said flexible element for reciprocating said engaging means longitudinally of said section.

8. In a conveying machine for conveying workpieces through a series of treating stations, the combination comprising an elongated frame extending along the treating stations, track means on said frame for supporting a work carrier movably mounted thereon, a section of said track means movable to and from a lowered position in alignment with said track means and a raised position above said track means for raising and lowering a work carrier thereon, lift means for moving said section to and from said lowered position and said raised position, a first pusher means including a series of pushers mounted on a reciprocable pusher bar slidably disposed on said frame below and longitudinally of said track means and reciprocable to and from a retracted position and an advanced position for advancing a work carrier along said track means, a second pusher means for advancing a work carrier along said section when in said raised position, said second pusher means comprising a pair of sprockets rotatably mounted on the end portions of said section, a continuous flexible member trained around said sprocket and extending longitudinally of said section, engaging means on said flexible member for engaging a work carrier on said section, gear means rotatably mounted on said frame below said section and having an engaging bore therethrough, said gear means disposed in constant meshing engagement with a rack on said pusher bar, shaft means connected to one of said sprockets and slidably disposed in said engaging bore for drivingly connecting said pusher bar to said flexible member whereby said engaging means thereon is caused to oscillate longitudinally of said section when said pusher bar is reciprocated.

9. In a conveying machine for conveying workpieces through a series of treating stations, the combination comprising an elongated frame extending along the treating stations, track means on said frame for supporting a work carrier movably mounted thereon, a section of said track means movable to and from a lowered position in alignment with said track means and a raised position above said track means for raising and lowering a work carrier thereon, lift means for moving said section to and from said lowered position and said raised position, a first pusher means including a series of pushers mounted on a reciprocable pusher bar slidably disposed on said frame below and longitudinally of said track means and reciprocable to and from a retracted position and an advanced position for advancing a work carrier along said track means, a second pusher means for advancing a work carrier along said section when in said raised position, said second pusher means comprising a pair of first sprockets rotatably mounted on the end portions of said section, a pair of second sprockets rotatably mounted on said frame adjacent the ends of said section, an elongated flexible member having the divergent ends thereof connected to said pusher bar and extending therefrom in a continuous manner around said second sprockets and over and between said first sprockets, said flexible member being of a length whereby when said section is in said raised position said flexible element is tautly disposed over said first and said second sprockets and longitudinally of said section, engaging means on the portion of said flexible element extending between said first sprockets for engaging and advancing a work carrier on said section when in said raised position during the advancing movement of said pusher bar.

10. In a conveying machine for conveying workpieces through a series of treating stations, the combination comprising an elongated frame extending along the treating stations, track means on said frame for supporting a work carrier movably mounted thereon, a section of said track means movable to and from a lowered position in alignment with said track means and a raised position above said track means for raising and lowering a work carrier thereon, lift means for moving said section to and from said lowered position and said raised position, a first pusher means including a series of pushers mounted on a reciprocable pusher bar slidably disposed on said frame below and longitudinally of said track means and reciprocable to and from a retracted position and an advanced position for advancing a work carrier along said track means, a second pusher means for advancing a work carrier along said section when in said raised position, said second pusher means comprising a framework depending from said section and movable therewith to and from said raised position and said lowered position, gear means rotatably mounted on the lower end portion of said framework, said gear means disposed in meshing engagement with a rack on said pusher bar when said section is in said raised position and out of meshing engagement with said rack when said section is in said lowered position, a plurality of sprockets rotatably mounted on said framework including a drive sprocket drivingly connected to said gear means and a pair of idler sprockets rotatably mounted at each end portion of said section, a continuous flexible member trained over said plurality of sprockets having a portion thereof extending between said idler sprockets and disposed longitudinally of said section, and engaging means on said portion for engaging and advancing a work carrier on said section when in said raised position during the reciprocating movement of said pusher bar.

11. In a conveying machine for conveying workpieces through a series of treating stations, the combination comprising an elongated frame extending along the treating stations, track means on said frame for supporting a work carrier movably mounted thereon, a section of said track means movable to and from a lowered position in alignment with said track means and a raised position above said track means for raising and lowering a work carrier thereon, lift means for moving said section to and from said lowered position and said raised position, a first pusher means including a series of pushers mounted on a reciprocable pusher bar slidably disposed on said frame below and longitudinally of said track means and reciprocable to and from a retracted position and an advanced position for advancing a work carrier along said track means, a second pusher means for advancing a work carrier along said section when in said raised position, said second pusher means comprising a framework depending from said section and movable therewith to and from said raised position and said lowered position, gear means rotatably mounted on the lower end portion of said frame work, said gear means disposed in meshing engagement with a rack on said pusher bar when said section is in said raised position and out of meshing engagement with said rack when said section is in said lowered position, a plurality of sprockets rotatably mounted on said framework including a drive sprocket drivingly connected to said gear means and a pair of idler sprockets rotatably mounted at each end portion of said section, a continuous flexible member trained over said plurality of sprockets having a portion thereof extending between said idler sprockets and disposed longitudinally of said section, engaging means on said portion for engaging and advancing a work carrier on said section during the reciprocating movement of said pusher bar, and coacting means on said flexible member and said frame for engaging said flexible member during the descending movement of said section and moving said flexible member and said engaging means thereon from an advanced position to a retracted position.

12. In a conveying machine for conveying workpieces through a series of treating stations, the combination comprising an elongated frame extending along the treating station, track means on said frame for supporting a work carrier movably mounted thereon, a section of said track means movable to and from a lowered position in alignment with said track means and a raised position above said track means for raising and lowering a work carrier thereon, first pusher means disposed below said track means for advancing the work carrier along said track means, second pusher means on said section below said track means thereon for advancing a work carrier along said section when in said raised position, and lift means for moving said section to and from said lowered position and said raised position, said lift means comprising a slide member connected to and depending from said section, guide means on said frame for slidably guiding said slide member during the ascending and descending movement thereof, and means coacting with said slide member for moving said slide member to and from said lowered position to said raised position.

13. In a conveying machine for conveying workpieces through a series of treating stations, the combination comprising an elongated frame extending along the treating stations, track means on said frame for supporting a work carrier movably mounted thereon, a section of said track means movable to and from a lowered position in alignment with said track means and a raised position above said track means for raising and lowering a work carrier thereon, first pusher means disposed below said track means for advancing the work carrier along said track means, second pusher means on said section below said track means thereon for advancing a work carrier along said section when in said raised position, and lift means for moving said section to and from said lowered position and said raised position, said lift means comprising a slide member connected to and depending from said section, guide means on said frame for slidably guiding said slide member during the ascending and descending movement thereof, a lift bar slidably disposed on said frame below and longitudinally of said track means and reciprocable to and from an advanced position and a retracted position, means for reciprocating said lift bar, roller means rotatably mounted on said frame, a flexible member extending over said roller means and having one end thereof connected to said lift bar and the other end thereof connected to said slide member whereby said slide member is moved to and from a lowered position and a raised position during the reciprocating movement of said lift bar.

14. In a conveying machine for conveying workpieces through a series of treating stations, the combination comprising an elongated frame extending along the treating stations, track means on said frame for supporting a work carrier movably mounted thereon, a section of said track means movable to and from a lowered position in alignment with said track means and a raised position above said track means for raising and lowering a work carrier thereon, first pusher means disposed below said track means for advancing the work carrier along said track means, second pusher means for advancing a work carrier along said section when in said raised position, and lift means for moving said section to and from said lowered position and said raised position, said lift means comprising a pair of slide members connected to and depending from the end portions of said section, guide means on said frame for slidably guiding said slide members during the ascending and descending movement thereof, a lift bar slidably disposed on said frame below and longitudinally of said track means and reciprocable to and from a retracted position and an advanced position, a pair of sprockets rotatably mounted on said frame and disposed adjacent to said pair of slide members, a flexible member trained over each of said pair of sprockets and having one end thereof connected to said lift bar and the other end thereof connected to the lower portion of each of said slide members whereby said slide members and said section thereon is moved to and from a lowered position and a raised position during the reciprocation of said lift bar.

15. In a conveying machine for conveying workpieces through a series of treating stations, the combination comprising an elongated frame extending along the treating stations, track means on said frame for supporting a series of work carriers movably mounted thereon, a pair of longitudinally spaced sections of said track means movable to and from a lowered position in alignment with said track means and a raised position above said track means for raising and lowering a work carrier thereon, means for raising and lowering said sections, first pusher means disposed below said track means for advancing the work carriers along said track means, second pusher means for advancing the work carriers along said sections when in said raised position, rail means disposed above said track means and extending between said sections for selectively engaging presettable means on said work carriers when in a raised position on one of said sections and maintaining said work carriers in said raised position as they are advanced between said sections, and third pusher means for advancing a work carrier engaged by said rail means therealong.

16. In a conveying machine for conveying workpieces through a series of treating stations, the combination comprising an elongated frame extending along the treating stations, track means on said frame for supporting a series of work carriers movably mounted thereon, a first section and a second section of said track means disposed in longitudinally spaced relationship from each other and movable to and from a lowered position in alignment with said track means and a raised position above said track means for raising and lowering a work carrier thereon, means for raising and lowering said first section and said second section, a first pusher means disposed below said track means for advancing the work carriers along said track means, second pusher means for advancing the work carriers along said first and said second sections when in said raised position, rail means disposed above said track means and extending between said first and said second sections, engaging means on selected ones of the work carriers for coating with means on said rail means for engaging and maintaining said selected work carriers in said raised position during their advancing movement along said first section and maintaining the engaged said selected work carrier in the raised position between said first and said second section, and third pusher means for advancing the engaged said selected work carrier along said rail means.

17. In a conveying machine for conveying workpieces through a series of treating stations, the combination comprising an elongated frame extending along the treating stations, track means on said frame for supporting a series of work carriers movably mounted thereon, a first section and a second section of said track means longitudinally spaced from each other and movable to and from a lowered position in alignment with said track means and a raised position above said track means, means for raising and lowering said first and said second sections, a first pusher means disposed below said track means for advancing the work carriers along said track means, second pusher means for advancing the work carriers along said first and said second sections when in said raised position, rail means disposed above and extending between said first section and said second section and including engaging means thereon movable to and from an engaging position and a nonengaging position, means urging said rail means to said engaging position, an engaging head on each of the work carriers adapted to be engaged by said rail means when in said engaging position, cam means on each of the work carriers for selectively cooperating with and moving said rail means to said non-engaging position, and third pusher means for advancing the work carriers engaged by said rail means thereby between said first and said second sections.

18. In a conveying machine for conveying workpieces through a series of treating stations, the combination comprising an elongated frame extending along the treating stations, track means on said frame for supporting a series of work carriers movably mounted thereon, a first section and a second section of said track means longitudinally spaced from each other and movable to and from a lowered position in alignment with said track means and a raised position above said track means, means for raising and lowering said first and said second sections, first pusher means disposed below said track means for intermittently advancing the work carriers along said track means, second pusher means for intermittently advancing the work carriers along said first and said second sections when in said raised position, rail means disposed above and extending between said first section and said second section and comprising a series of engaging sections disposed in aligned end to end relationship, each of said engaging sections comprising a pair of side members movable to and from a contracted position and an expanded position, means urging said side members to said contracted position, an engaging head on each of the work carriers, an engaging flange extending along each of said side members and adapted to underlie and engage said engaging head when in said contracted position, cam means associated with said engaging head on each of the carriers and movable to and from an operative position and an inoperative position, said cam means when in said inoperative position disposed out of contact with said side members and when in said operative position adapted to coact with and move said side members to said expanded position, and third pusher means extending longitudinally along said rail means for intermittently advancing work carriers engaged by said rail means therealong between said first and said second sections.

19. In a conveying machine for conveying workpieces through a series of treating stations, the combination comprising an elongated frame extending along the treating stations, track means on said frame for supporting a series of work carriers movably mounted thereon, a first lift section and a second lift section of said track means longitudinally spaced from each other and movable to and from a lowered position in alignment with said track means and a raised position above said track means, means for raising and lowering said first and said second lift sections, an auxiliary lift section disposed intermediate of said first and said second lift sections and movable to and from a lowered position in alignment with said track means to a raised position above said track means, means for raising and lowering said first and said second lift sections, means for selectively raising and lowering said auxiliary lift sections, first pusher means disposed below said track means for intermittently advancing the work carriers along said track means and said auxiliary lift section when in said lowered position, second pusher means for intermittently advancing the work carriers along said first and said second lift sections when in said raised position, rail means disposed above and extending between said first lift section and said second lift section and comprising a series of engaging sections disposed in aligned end to end relationship, each of said engaging sections including engaging means thereon movable to and from an engaging position and a nonengaging position, means urging said engaging sections to said engaging position, an engaging head on each of the work carriers adapted to be engaged by said engaging sections when in said engaging position during advancement of the carrier along said first lift section when in said raised position, cam means on each of the work carriers for selectively cooperating with and moving selected ones of said engaging sections to said nonengaging position and disengaging said engaging head therefrom, means coordinated with said cam means for raising said auxiliary lift section to receive and lower a work carrier selectively disengaged from one of said engaging rail sections thereabove providing thereby a delayed-dip operation, and third pusher means for intermittently advancing the work carriers engaged by said rail means along said engaging sections and said auxiliary lift section when in said raised position.

20. In a conveying machine for conveying workpieces through a series of treating stations, the combination comprising an elongated frame extending along the treating stations, track means on said frame for supporting a series of work carriers movably mounted thereon, a first lift section and a second lift section of said track means longitudinally spaced from each other and movable to and from a lowered position in alignment with said track means and a raised position above said track means, means for raising and lowering said first and said second lift sections, a plurality of auxiliary lift sections disposed intermediate of said first and said second lift sections and independently movable to and from a lowered position in alignment with said track means to a raised position above said track means, means for raising and lowering said first and said second lift sections, means for independently and selectively raising and lowering said auxiliary lift sections, first pusher means disposed below said track means for intermittently advancing the work carriers along said track means and said auxiliary lift sections when in said lowered position, second pusher means for intermittently advancing the work carriers along said first and said second lift sections when in said raised position, rail means disposed above and extending between said first lift section and said second lift section and comprising a series of engaging sections disposed in aligned end to end relationship, each of said engaging sections including engaging means thereon movable to and from an engaging position and a nonengaging position, means urging said engaging sections to said engaging position, an engaging head on each of the work carriers adapted to be engaged by said engaging sections when in said engaging position during advancement of the carrier along the first lift section when in said raised position, cam means on each of the work carriers for selectively cooperating with and moving selected ones of said engaging sections to said nonengaging position and disengaging said engaging head therefrom, means coordinated with said cam means for raising selected ones of said auxiliary lift sections to receive and lower a work carrier selectively disengaged from one of said engaging rail sections thereabove providing thereby a selected delayed-dip operation, and third pusher means for intermittently advancing the work carriers engaged by said rail means along said engaging sections and said auxiliary lift sections when in said raised position.

21. In a conveying machine for conveying workpieces through a series of treating stations, the combination comprising an elongated frame extending along the treating stations, track means on said frame for supporting a series of work carriers movably mounted thereon, a first lift section and a second lift section of said track means longitudinally spaced from each other and movable to and from a lowered position in alignment with said track means and a raised position above said track means, means for raising and lowering said first and said second lift sections, an auxiliary lift section disposed intermediate of said first and said second lift sections and movable to and from a lowered position in alignment with said track means to a raised position above said track means, means for raising and lowering said first and said second lift sections, means for selectively raising and lowering said auxiliary lift sections, first pusher means disposed below said track means for intermittently advancing the work carriers along said track means and said auxiliary lift section when in said lowered position, second pusher means for intermittently advancing the work carriers along said first and said second lift sections when in said raised position, rail means disposed above and extending between said first lift section and said second lift section and comprising a series of engaging sections disposed in aligned end to end relationship, each of said engaging sections including engaging means thereon movable to and from an engaging position and a nonengaging position, means urging said engaging sections to said engaging position, an engaging head on each of the work carriers adapted to be engaged by said engaging section when in said engaging position, cam means on each of the work carriers for selectively cooperating with said rail means during advancement of the carrier along said first lift section when in said raised position and selectively moving the first of said engaging sections to said nonengaging position enabling the work carrier to be lowered on said first lift section to said lowered position, means coordinated with selected ones of said work carriers for selectively raising said auxiliary lift sections and a selected carrier thereon and causing said engaging head on said carrier to become engaged by said engaging section thereabove providing therewith a selective early pickup operation, and third pusher means for intermittently advancing the work carriers engaged by said rail means along said engaging sections and said auxiliary lift section when in said raised position.

22. The conveying machine described in claim 1 wherein said elongated frame includes an arcuate section having arcuate track means thereon for supporting a work carrier movably mounted thereon.

23. The conveying machine described in claim 5 wherein said elongated frame includes an arcuate frame section, said arcuate frame section comprising arcuate track means for supporting a work carrier movably mounted thereon, a plurality of articulated links slidably and guidably disposed on said arcuate frame section below said arcuate track means, the end ones of said links connected to said pusher bar and reciprocable thereby to and from a retracted position and an advanced position, and a series of pushers pivotally mounted on said links and adapted to engage and advance a work carrier during the advancing movement of said links.

24. The conveying machine described in claim 13 wherein said elongated frame includes an arcuate frame section comprising arcuate track means on said arcuate frame for supporting a work carrier movably mounted thereon, means for advancing a work carrier along said arcuate track means, and a plurality of articulated links guidably disposed on said arcuate frame and extending therealong, the end ones of said articulated links connected to said lift bar and reciprocable thereby.

25. The combination of an elevating and transfer mechanism for conveying workpieces through a series of treating stations comprising a frame, track means on said frame for supporting a work carrier movably mounted thereon, said track means movable to and from a raised position and a lowered position, lift means disposed below said track means for moving said track means to and from said raised position and said lowered position, and pusher means disposed below said track means and movable therewith to and from said raised position and said lowered position for advancing a work carrier therealong when said track means are in said raised position.

26. The combination of an elevating and transfer mechanism for conveying workpieces through a series of treating stations comprising a frame, track means on said frame for supporting a work carrier movably mounted thereon, said track means movable to and from a lowered position and a raised position, lift means for moving said track means to and from said lowered position and said raised position, and pusher means disposed below said track means and movable therewith to and from said raised position and said lowered position for advancing a work carrier therealong when said track means are in said raised position, said lift means comprising slide means connected to and depending from said track means, guide means on said frame coacting with and slidably guiding said slide means during the ascending and descending movement thereof, and means coacting with said slide means for moving said slide means to and from a raised position and a lowered position.

27. The combination of an elevating and transfer mechanism for conveying workpieces through a series of treating stations comprising a frame, track means on said frame for supporting a work carrier movably mounted thereon, said track means movable to and from a lowered position and a raised position, lift means for moving said track means to and from said lowered position and said raised position, and pusher means disposed below said track means for advancing a work carrier therealong when said track means are in said raised position, said lift means comprising a slide member connected to and depending from said track means, guide means on said frame for slidably guiding said slide member during the ascending and descending movement thereof, a lift bar slidably disposed on said frame below and longitudinally of said track means and reciprocable to and from an advanced position and a retracted position, means for reciprocating said lift bar, roller means rotatably mounted on said frame, a flexible member extending over said roller means and having one end thereof connected to said lift bar and the other end thereof connected to said slide member whereby said slide member is moved to and from a lowered position and a raised position during the reciprocating movement of said bar.

28. The combination of an elevating and transfer mechanism for conveying workpieces through a series of treating stations comprising a frame, track means on said frame for supporting a work carrier movably mounted thereon, said track means movable to and from a lowered position and a raised position, lift means for moving said track means to and from said lowered position and said raised position, and pusher means disposed below said track means for advancing a work carrier therealong when said track means are in said raised position, said lift means comprising a pair of slide members connected to and depending from the end portions of said track means, guide means on said frame for slidably guiding said slide members during the ascending and descending movement thereof, a lift bar slidably disposed on said frame below and longitudinally of said track means and reciprocable to and from a retracted position and an advanced position, a pair of sprockets rotatably mounted on said frame and disposed adjacent to said pair of slide members, a flexible member trained over each of said pair of sprockets and having one end thereof connected to said lift bar and the other end thereof connected to the lower portion of each of said slide members whereby said slide members and said track means thereon are moved to and from a lowered position and a raised position during the reciprocating movement of said lift bar.

References Cited in the file of this patent

UNITED STATES PATENTS

| | | |
|---|---|---|
| 1,000,107 | Morris | Aug. 8, 1911 |
| 1,577,589 | Rapp | Mar. 23, 1926 |
| 2,048,938 | Larson et al. | July 28, 1936 |
| 2,075,209 | Kuebler | Mar. 30, 1937 |
| 2,484,079 | Davis | Oct. 11, 1949 |
| 2,738,888 | Todd et al. | Mar. 20, 1956 |
| 2,854,159 | Abbey | Sept. 30, 1958 |
| 2,881,711 | Davis et al. | Apr. 14, 1959 |
| 2,956,514 | Bishop | Oct. 18, 1960 |
| 2,979,181 | Abbey | Apr. 11, 1961 |
| 2,989,060 | Fiston | June 20, 1961 |